(12) United States Patent
Hirasago

(10) Patent No.: US 6,332,108 B1
(45) Date of Patent: Dec. 18, 2001

(54) VEHICULAR RUN CONTROLLING APPARATUS AND METHOD FOR AUTOMOTIVE VEHICLE

(75) Inventor: Kiyomi Hirasago, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/605,535

(22) Filed: Jun. 29, 2000

(30) Foreign Application Priority Data

Jun. 30, 1999 (JP) .................................................. 11-186498

(51) Int. Cl.⁷ ............................. B60K 41/20; B60T 7/12; G06F 7/00
(52) U.S. Cl. ............................. 701/93; 701/96; 340/903; 340/435
(58) Field of Search ................................ 701/96, 93, 301, 701/97; 340/903, 435, 988; 180/333; 123/352; 318/568.1, 570, 571, 587

(56) References Cited

U.S. PATENT DOCUMENTS 5,959,572    9/1999   Higashimata et al. ................. 342/70
6,185,499 *  2/2001   Kinoshita et al. ..................... 701/96

FOREIGN PATENT DOCUMENTS 7-47862     2/1995   (JP) .
10-151964   6/1998   (JP) .
10-198893   7/1998   (JP) .

* cited by examiner

Primary Examiner—Tan Nguyen
Assistant Examiner—Dalena Tran
(74) Attorney, Agent, or Firm—Foley & Lardner

(57) ABSTRACT

In a vehicular run controlling apparatus and method, a vehicular run controller is provided to perform a vehicular run control on the basis of a vehicular velocity of the vehicle and a vehicular running environment surrounding the vehicle, the vehicular run controller having at least two control modes of a control wait mode and a vehicular run mode, falling in a state of the vehicular run control when a start of the vehicular run control by means of the vehicular run controller is set through a vehicular run control setter, falling in a halt state of the vehicular run control when a release of the vehicular run control is set through the vehicular run control setter, carrying out a mode transition from one control mode to the other control mode when the mode transition from the one control mode to the other control mode is instructed through a mode transition instructor according to a vehicular driver's will and when a predetermined condition is established during the vehicular run control irrespective of the vehicular driver's will, and informing the vehicular driver through an informing device such as an alarm unit of an occurrence of the mode transition from the one control mode to the other control mode when the mode transition from the one control mode to the other control mode occurs.

11 Claims, 20 Drawing Sheets

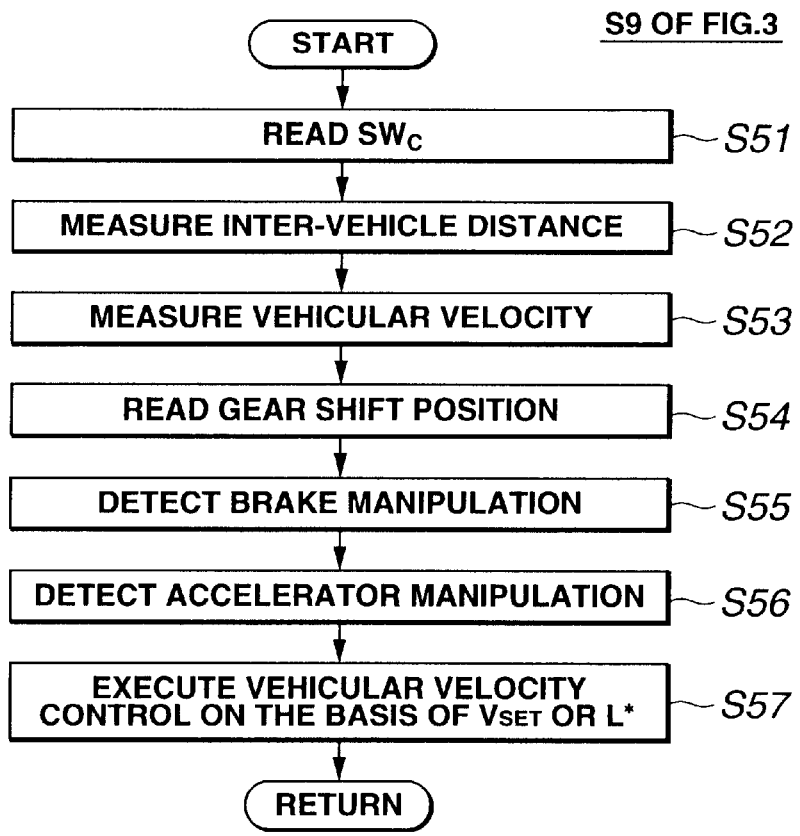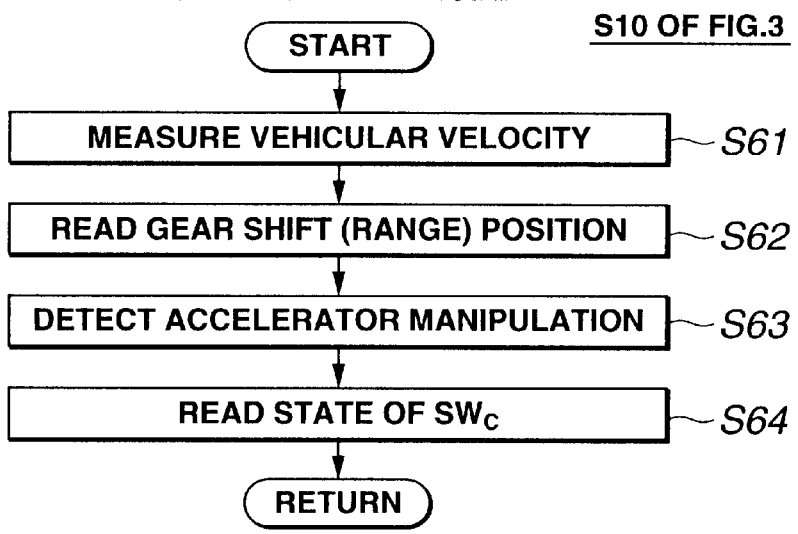

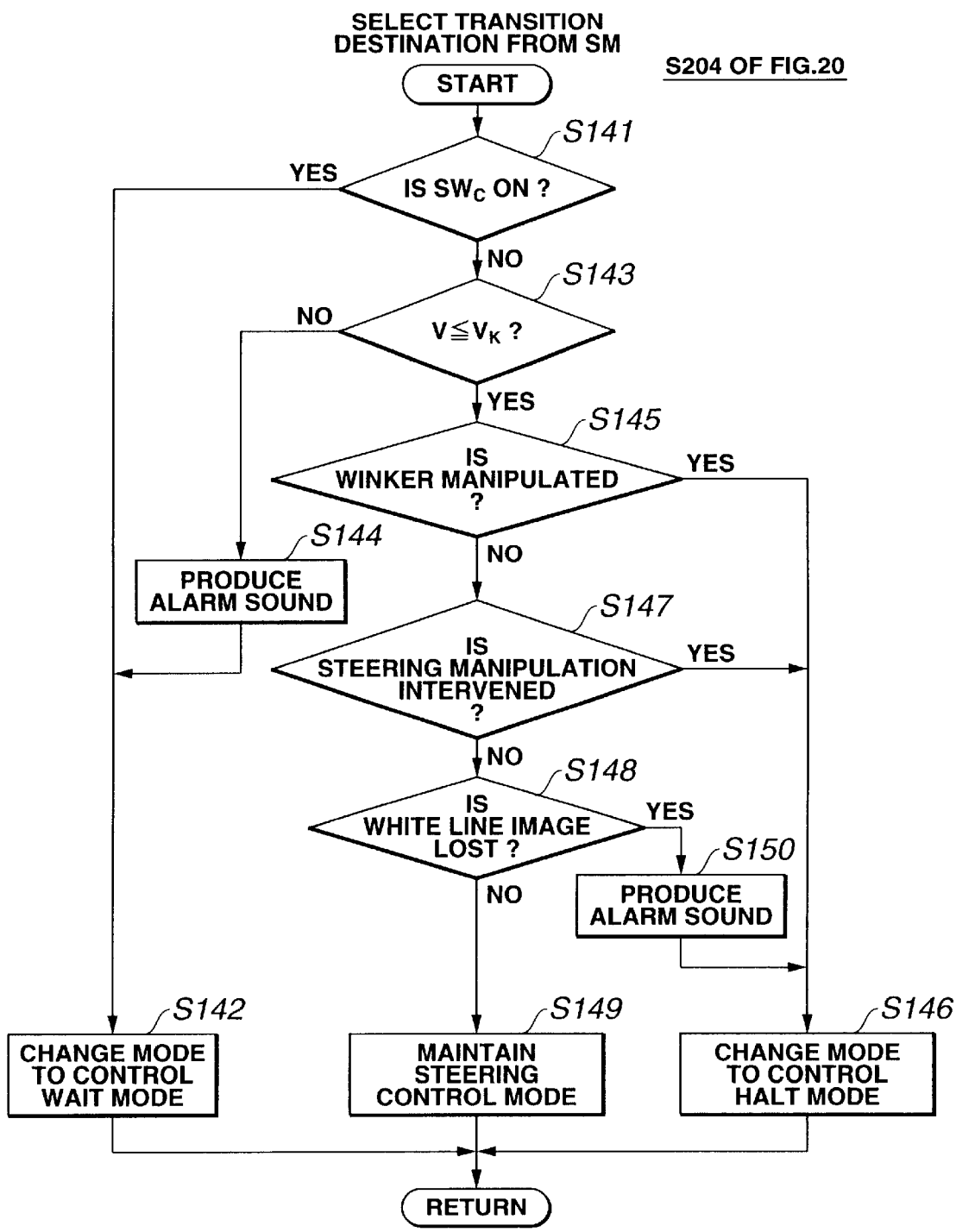

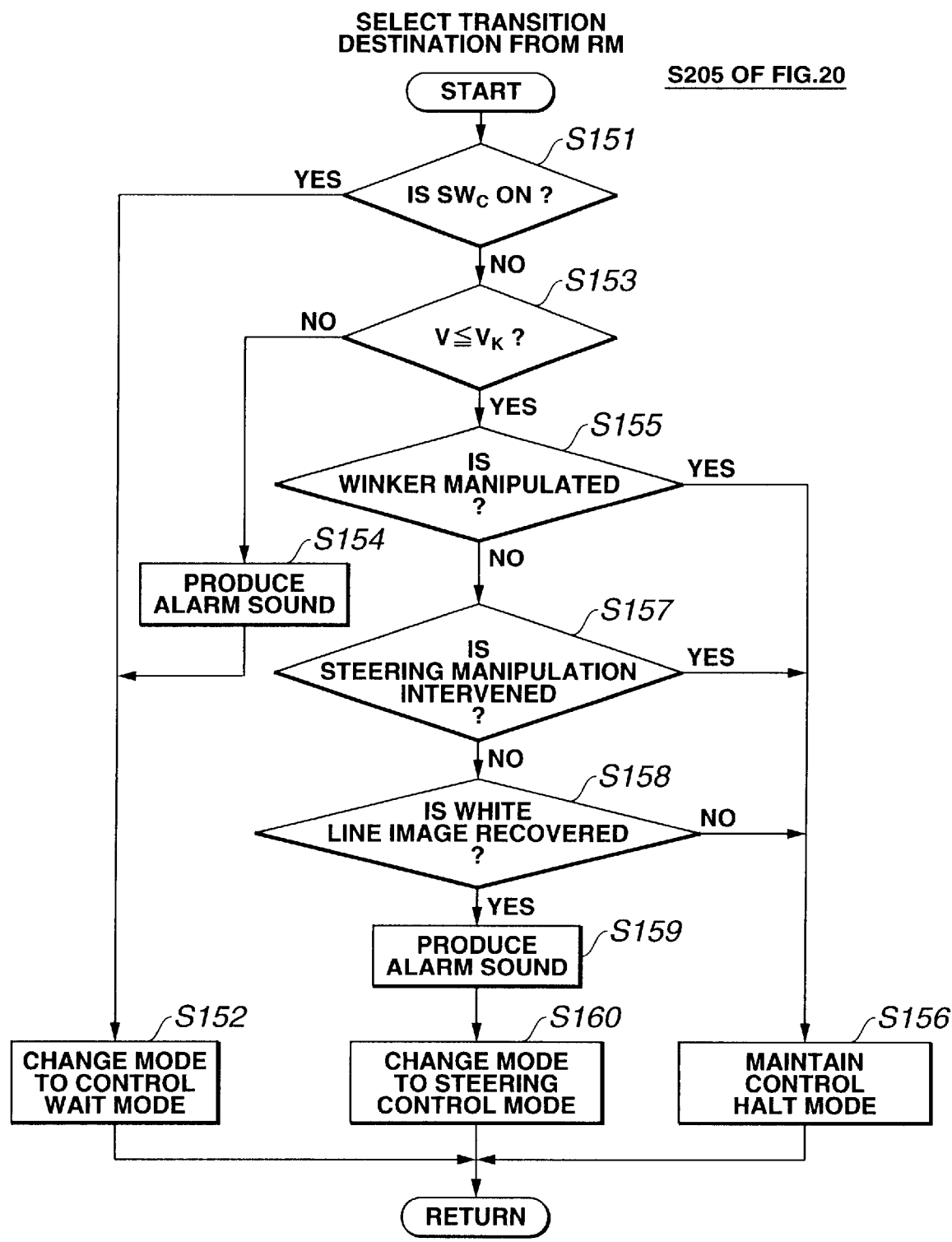

VEHICULAR RUN CONTROLLING APPARATUS AND METHOD FOR AUTOMOTIVE VEHICLE

BACKGROUND OF THE INVENTION

1. Field of the invention

The present invention relates to vehicular run controlling apparatus and method for an automotive vehicle which detect a vehicular running environment surrounding the vehicle, for example, detect a preceding vehicle which is running ahead of the vehicle or a white line on a road surface on which the vehicle is running to perform a vehicular run control.

2. Description of the related art

A Japanese Patent Application First Publication No. Heisei 7-47862 published on Feb. 21, 1995 exemplifies a previously proposed vehicular run controlling apparatus.

In the previously proposed vehicular run controlling apparatus, when a vehicular driver pushes a set switch during a vehicular run, even with an accelerator pedal released, the vehicle falls in a, so-called, following control state such that the vehicle is running, maintaining an appropriate inter-vehicle distance from the vehicle to such a preceding vehicle as described above if the preceding is present, and the vehicle is cruising maintaining a previously set vehicular velocity if no preceding vehicle is present.

In addition, this following control state is released when the vehicular driver manipulates a brake pedal or the accelerator pedal or changes a present gear range position to another range of a vehicular automatic transmission.

Furthermore, when the vehicular velocity of the vehicle falls out of a predetermined controllable range of the vehicular velocity within which the vehicular velocity can be controlled during the following control described above, the following control is automatically released without intervention of the vehicular driver's manipulation for the vehicle.

SUMMARY OF THE INVENTION

However, in the above-described previously proposed vehicular run controlling apparatus, for example, a wholly different function of releasing the control is provided in a brake which is, in nature, a deceleration function. Hence, although the following control is released in response to a vehicular driver's light depression of the brake pedal due to a narrowing of the inter-vehicle distance from the vehicle to the preceding vehicle during the following control of the vehicle, the vehicular driver does not often recognize (or often has no consciousness) that the following control has been released.

In addition, although the following control is automatically released in a case where the vehicular velocity is remarkably decreased and exceeds a vehicular deceleration controllable vehicular velocity range due to a traffic congestion, the vehicular driver does not often recognize that this control is released automatically since no vehicular driver's manipulation for the vehicle is involved.

As described above, such a state transition (hereinafter, also referred to as a mode transition) from one control state (mode) to another control state (mode) that the vehicular driver does not often recognize sometimes makes a mismatch to the vehicular driver's sense of vehicular driving.

It is, therefore, an object of the present invention to provide vehicular run controlling apparatus and method for an automotive vehicle which can positively inform the vehicular driver of such a state transition from one control state to another control state that would be deemed not to be recognized by the vehicular driver when the above-described state transition occurs.

According to one aspect of the present invention, there is provided a vehicular run controlling apparatus for an automotive vehicle, comprising: a vehicular velocity detector to detect a vehicular velocity of the vehicle; a vehicular running environment detector to detect a running environment surrounding the vehicle; an informing device; and a vehicular run controller to perform a vehicular run control on the basis of the vehicular velocity detected by the vehicular velocity detector and the running environment detected by the vehicular running environment detector, the vehicular run controller having at least two control modes of a control wait mode and a vehicular run mode and including: a vehicular run control setter to set whether the vehicular run control should be started; and a mode transition instructor to instruct a mode transition from one control mode to another control mode in the vehicular run controller according to a vehicular driver's will, the vehicular run controller falling in a state of the vehicular run control when a start of the vehicular run control by means of the vehicular run controller is set through the vehicular run control setter, falling in a halt state of the vehicular run control when a release of the vehicular run control is set through the vehicular run control setter, carrying out the mode transition from one control mode to the other control mode when the mode transition from the one control mode to the other control mode is instructed through the mode transition instructor and when a predetermined condition is established during the vehicular run control irrespective of the vehicular driver's will, and informing the vehicular driver through the informing device of an occurrence of the mode transition from the one control mode to the other control mode when the mode transition from the one control mode to the other control mode occurs.

According to another aspect of the present invention, there is provided a vehicular run controlling method for an automotive vehicle comprising: detecting a vehicular velocity of the vehicle; detecting a running environment surrounding the vehicle; providing an informing device; and providing a vehicular run controller to perform a vehicular run control on the basis of the detected vehicular velocity and the detected running environment, the vehicular run controller having at least two control modes of a control wait mode and a vehicular run mode and including: a vehicular run control setter to set whether the vehicular run control should be started; and a mode transition instructor to instruct a mode transition from one control mode to another control mode in the vehicular run controller according to a vehicular driver's will, the vehicular run controller falling in a state of the vehicular run control when a start of the vehicular run control by means of the vehicular run controller is set through the vehicular run control setter, falling in a halt state of the vehicular run control when a release of the vehicular run control is set through the vehicular run control setter, carrying out the mode transition from one control mode to the other control mode when the mode transition from the one control mode to the other control mode is instructed through the mode transition instructor and when a predetermined condition is established during the vehicular run control irrespective of the vehicular driver's will, and informing the vehicular driver through the informing device of an occurrence of the mode transition from the one control mode to the other control mode when the mode transition from the one control mode to the other control mode occurs.

This summary of the invention does not necessarily describe all necessary features so that the invention may also be a sub-combination of these described features.

BRIEF DESCRIPTION OF THE DRAWINGS

FIG. 8 is an operational flowchart representing a control halt mode procedure shown in FIG. 3.

FIG. 9 is an operational flowchart representing a control halt mode procedure shown in FIG. 3.

FIG. 22 is an operational flowchart representing the transition destination selection procedure from a steering control mode shown in FIG. 20.

FIG. 23 is an operational flowchart representing the transition destination selection procedure from the control halt mode shown in FIG. 20.

DETAILED DESCRIPTION OF THE PREFERRED EMBODIMENTS

Reference will hereinafter be made to the drawings in order to facilitate a better understanding of the present invention.

(First Embodiment)

Figure 1A:
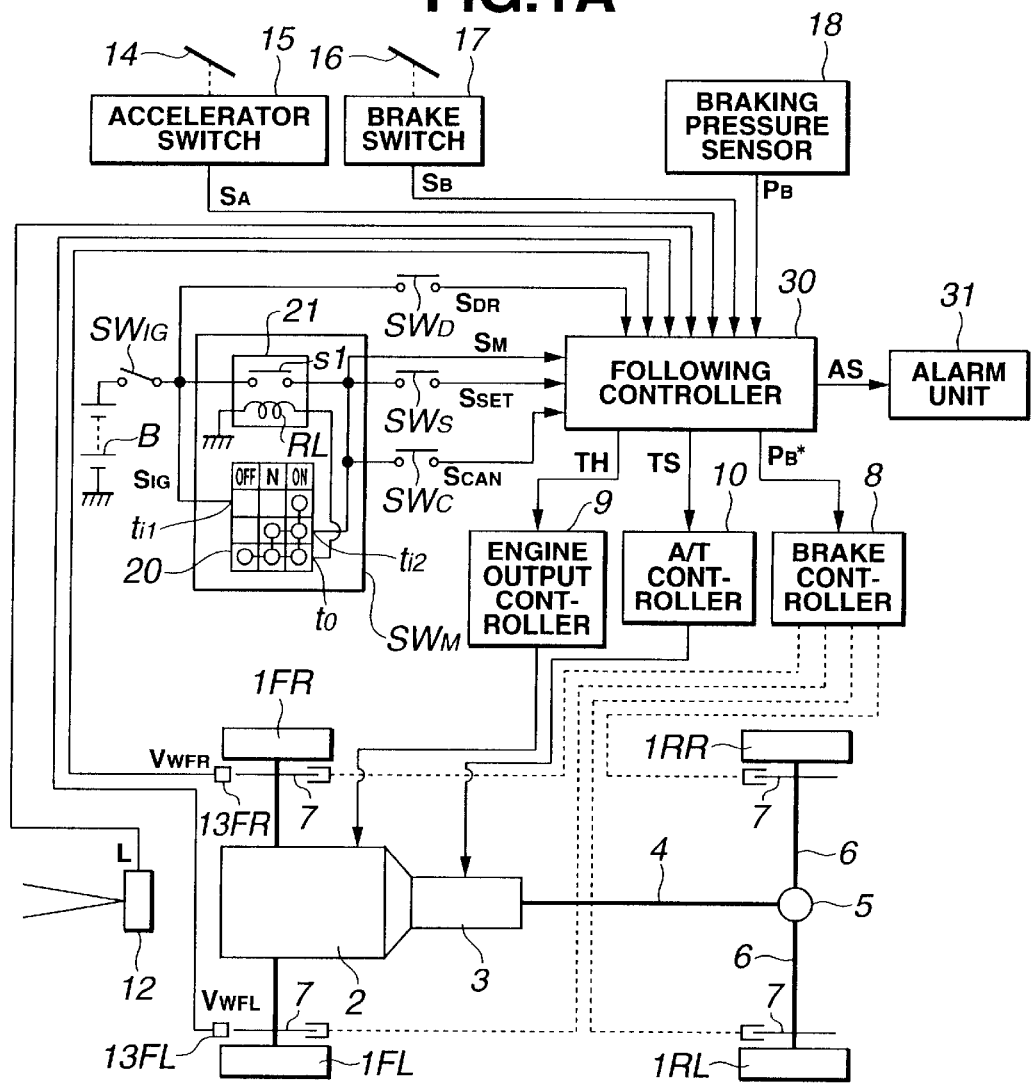
FIG. 1A is a schematic circuit block diagram of a first preferred embodiment of a vehicular run controlling apparatus according to the present invention.

FIG. 1A shows a rough configuration representing a rear-wheel driven vehicle to which a first preferred embodiment of a vehicular following controlling apparatus according to the present invention is applicable.

In FIG. 1A, 1FL and 1FR denote front left and right road wheels as non-driven wheels and 1RL and 1RR denote rear left and right road wheels as driven wheels.

Rear left and right road wheels 1RL and 1RR are rotationally driven to which a driving force (or prime mover) of an engine 2 is transmitted via an automatic transmission 3, a propeller shaft 4, a final speed-reduction unit 5, and a wheel axle 6.

A disc brake 7 is installed on each of front and rear left and right road wheels 1FL, 1FR, 1RL, and 1RR to develop a braking force and a braking liquid pressure (a brake hydraulic) to each disc brake 7 is controlled by means of a brake controller 8.

It is noted that brake controller 8 develops the braking liquid (oil) pressure in accordance with a depression depth of a brake pedal 16 (which corresponds to a brake manipulator, in a broad sense of term) as will be described later and in accordance with target braking pressure $P_B^*$ from a following controller 30.

An Engine output controller 9 is disposed on engine 2 to control an output of engine 2. Engine output controller 9 has adopted one of two engine output control methods, i.e., a method of adjusting opening angle TH of a throttle valve of engine 2 to control an engine speed and another method of adjusting an opening angle of an idle control valve of engine 2 to control an idling speed of engine 2. In the first embodiment, the method of adjusting the opening angle of the engine throttle valve is adopted.

A transmission (A/T) controller 10 is disposed on automatic transmission 3 to control a gear shift position of transmission 3. Transmission controller 10 is so arranged that when an up-shift/down-shift command value TS is received from following controller 30, the gear shift position of transmission 3 is controlled to be shifted up or shifted down, as will be described later.

On the other hand, an inter-vehicle distance sensor 12 constituted by a radar unit is disposed on a front lower end portion of the vehicle which sweeps a laser light beam in a front width-wise direction (so-called, detection zone) of the vehicle and receives a reflected light beam from an object which is a preceding vehicle running ahead of the vehicle at the same traffic lane as the vehicle. Inter-vehicle distance sensor 12 detects an inter-vehicle distance from the vehicle to the preceding vehicle as inter-vehicle distance detecting means covered by vehicular running environment detecting means.

In the vehicle shown in FIG. 1A, two wheel velocity sensors 13FL and 13FR which detect wheel velocities of, for example, front left and right road wheels 1FL and 1FR which are the non-driven wheels, accelerator switch 15 which detects a depression of accelerator pedal 14 (which corresponds to an accelerator in a broad sense of term), a brake switch 17 which detects a depression of brake pedal 16, a braking pressure sensor 16 which detects a braking pressure outputted from brake controller 8, a main switch $SW_M$ which serves as a vehicular run setter to select whether a following control should be carried out or not, a set switch $SW_S$ which serves to set a set vehicular velocity, a cancel switch $SW_C$ which serves as release instructing means, and a Drive range detecting switch $SW_D$ which is turned on when a Drive ("D") range of automatic transmission 3 is selected through a select lever are disposed. It is noted that set switch $SW_S$, cancel switch $SW_C$, and Drive range detecting switch $SW_D$ constitute mode transition instructing means defined in the claims.

Main switch $SW_M$ includes a momentary type exchange switch 20 which is operated in accordance with the vehicular driver's will and self-hold type relay circuit 21. One end of exchange switch 20 is connected to a battery B via ignition switch SWIG.

Exchange switch 20 is arranged as follows:

When exchange switch 20 is turned off, a junction between a first input terminal ti1 to which switch signal SIG is inputted and an output terminal t0 is in an interrupted state. When switch 20 is in a neutral position, the junction between a second input terminal ti2 to which a power supply from a relay circuit 21 is inputted and output terminal t0 is in a connection state. When switch 20 is turned on, first and second input terminals ti1 and ti2 and output terminal t0 are in the connection state.

Relay circuit 21 includes a normally open contact s1 and relay coil RL. One end of normally open contact s1 is connected to ignition switch $SW_{IG}$ and the other end thereof is connected to following controller 30 as will be described later directly and via set switch $SW_S$ and to second input terminal ti2 of exchange switch 20. One end of relay coil RL is connected to the output terminal of exchange switch 20 and the other end thereof is grounded.

Following controller 30 receives each detection signal from inter-vehicle distance sensor 12, wheel velocity sensors 13FL and 13FR, accelerator switch 15, brake switch 17, and braking pressure sensor 18, respective switch signals $S_M$, $S_{SET}$, and $S_{CAN}$ from main switch $SW_M$, switch signal $S_M$ indicating the selection of whether the following control should be carried out, set switch $SW_S$, and cancel switch $SW_C$, and a switch signal $S_{DR}$ from Drive range detecting switch $SW_D$. Following controller 30, in accordance with a state transition diagram representing transition states on the following control shown in FIG. 2, has three control states (modes), viz., a control wait mode WM; a following mode FM; and a control halt mode. It is noted that, in following mode FM, following controller 30 controls the vehicular velocity through brake controller 8, engine output controller 9, and transmission controller 10 in such a manner that detected vehicular velocity Vs is made substantially equal to set vehicular velocity $V_{SET}$ when the preceding vehicle is not trapped by means of inter-vehicle distance sensor 12 and an actual inter-vehicle distance L is made substantially equal to a target inter-vehicle distance L* when preceding vehicle is trapped by means of inter-vehicle distance sensor 12. In the control halt mode, following controller 30 takes a priority on the vehicular driver's manipulation higher than the following control mode with the control in following mode FM halted and a predetermined condition established. Following controller 30 is, thus, managed to fall into the three control modes described above in accordance with predetermined transition conditions.

Figure 2:
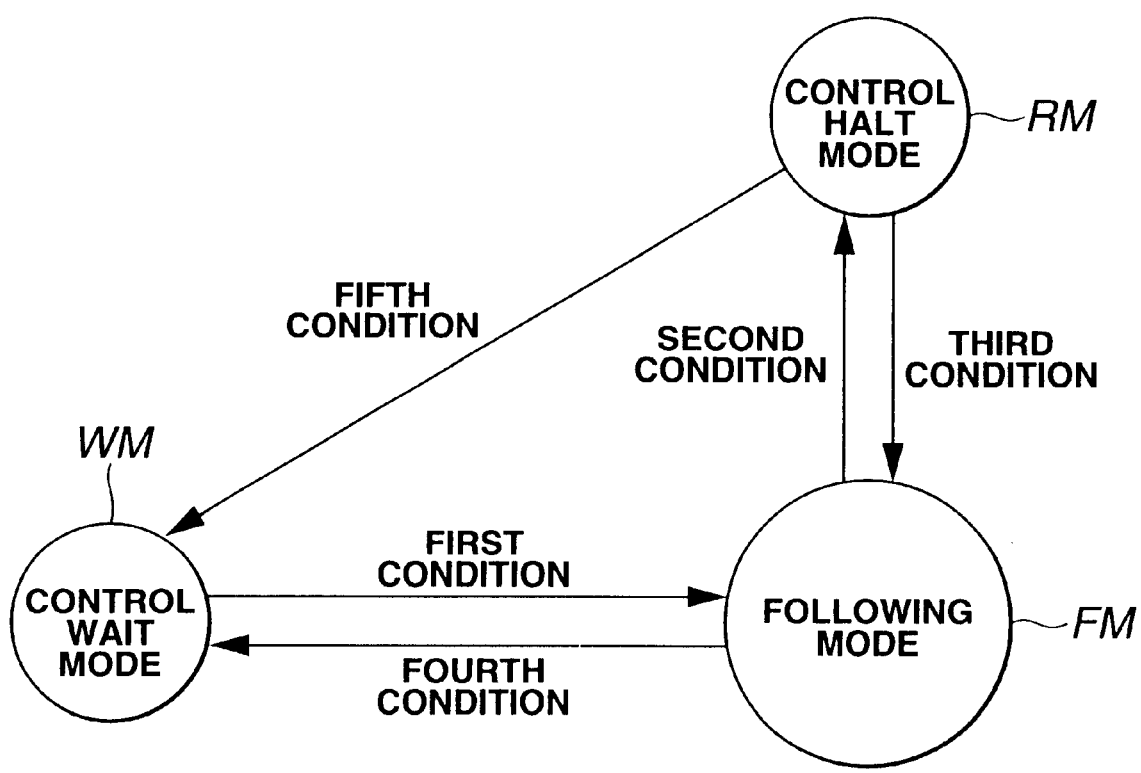
FIG. 2 is an explanatory view of a state (mode) transition diagram (STD) representing transition states (modes) of the following controller shown in FIGS. 1A and 1B.

In details, when main switch $SW_M$ is turned on from a turned-off state, following controller 30 enters control wait mode WM from a following run control stop state external to FIG. 2.

Then, in control wait mode WM, the mode transition of following controller 30 occurs from control wait mode WM to following mode FM when a first condition is established. The first condition is such that, in control wait mode WM, the gear range position of automatic transmission 3 is in the Drive range, the vehicle is running with brake switch 17 turned off and set switch $SW_S$ is in the turn off state.

In addition, when, in following mode FM, a second condition is established, the mode transition from following mode FM to control halt mode RM occurs. The second condition is such that an acceleration manipulation by the vehicular driver occurs, viz., accelerator switch 15 is turned on with accelerator pedal 14 depressed.

In addition, when, in control halt mode RM, a third condition is established, the mode transition from control halt mode RM to following mode FM occurs. The third condition is such that, in control halt mode RM, with accelerator pedal 14 depressed by the vehicular driver to perform a vehicular acceleration, accelerator pedal 14 is released so that accelerator switch 15 is turned off from the turn-on state.

In addition, when, in following mode FM, a fourth condition is established, the mode transition from following mode FM to control wait mode WM occurs. The fourth condition is such that, in following mode FM, cancel switch $SW_C$ is turned on, the vehicular driver selects any other range than the Drive range through the select lever so that Drive range detecting switch $SW_D$ is turned off from its turned on state, brake pedal 16 is further depressed mode deeply (this is detected by braking pressure sensor 18 as will be described later), or vehicular velocity Vs is decreased and exceeds a predetermined velocity value.

Furthermore, when, in control halt mode RM, a fifth condition is established, the mode transition from control halt mode RM to control wait mode WM occurs. The fifth condition is such that, in control halt mode RM, cancel switch $SW_C$ is turned on with accelerator pedal 14 depressed by the vehicular driver to accelerate the vehicle, the vehicular driver selects any other range than the Drive range through the select lever so that Drive range detecting switch $SW_D$ is turned off, or vehicular velocity Vs is increased and exceeds another predetermined velocity value.

When such a mode transition from the one control mode to another control mode that it tends to become insufficient for the vehicular driver to recognize the mode transition occurs, following controller 30 outputs an alarm signal AS to an informing device such as an alarm unit 31 which produces an alarm sound.

Next, an operation of the first preferred embodiment of the vehicular run controlling apparatus will be described with reference to a following control procedure executed in following controller 30 and shown in FIG. 3.

Figure 1B:
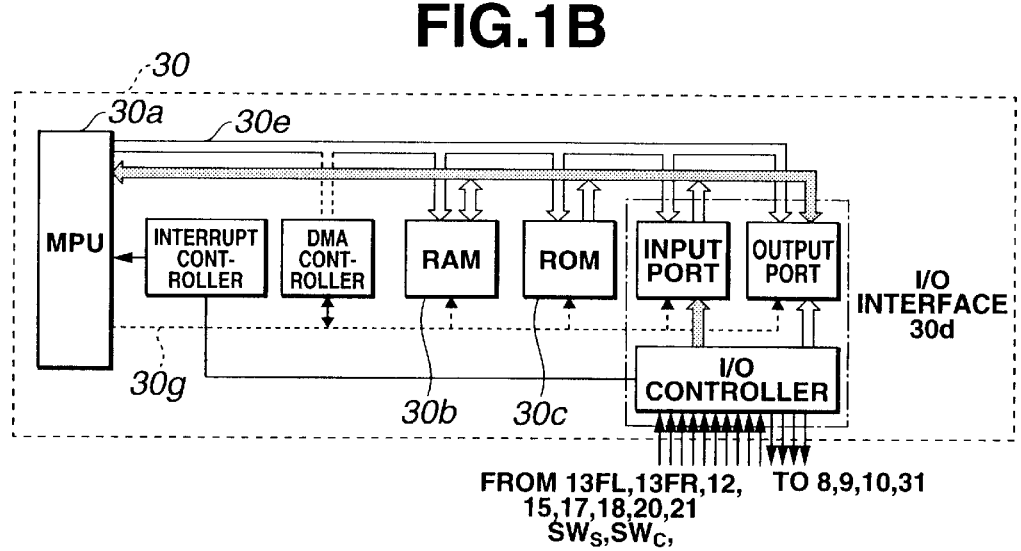
FIG. 1B is a schematic internal circuit block diagram of a following controller shown in FIG. 1A.
Figure 3:
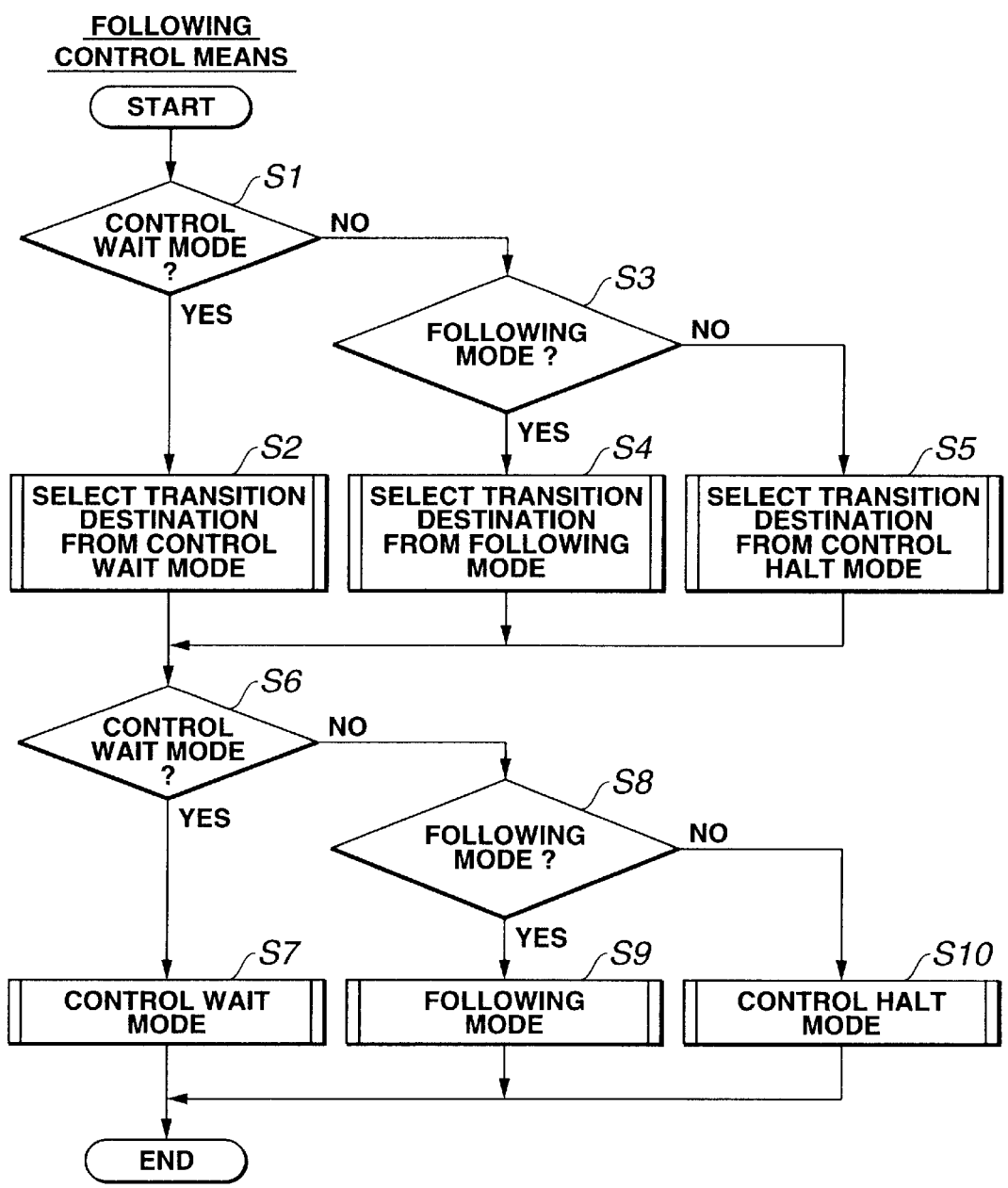
FIG. 3 is an operational flowchart representing an example of a following control procedure executed in the following controller shown in FIGS. 1A and 1B.

The following control procedure shown in FIG. 3 is executed as a main program routine. It is noted that following controller 30 includes a microcomputer whose basic structure is shown in FIG. 1B. In FIG. 1B, the microcomputer has an MPU 30a (MircoProcessor Unit), an interrupt controller, a DMA (Direct Memory Access) controller, a RAM 30b (Random Access Memory), a ROM 30c (Read Only Memory), an I/O interface 30d having an input port, an output port, and an I/O controller, an address bus 30e, a data bus 30f, and a control bus 30g.

Following controller 30 determines whether the present control mode is in control wait mode WM. If Yes at a step S1 (control wait mode), the routine goes to a step S2. At step S2, following controller 30 executes such a transition destination selection procedure as to select to which mode the mode transition from control wait mode WM occurs and the routine goes to a step S6. The transition destination selection procedure executed at step S2 will be described later (as a subroutine).

In addition, if No at step S1, the routine goes to a step S3. At step S3, following controller 30 determines if the present control mode is following mode FM. If Yes at step S3, the routine goes to a step S4. At step S4, following controller 30 executes such another transition destination selection procedure as to select to which mode the mode transition from following mode FM occurs. The other transition destination selection procedure at step S4 will be described later (as a subroutine).

Furthermore, if No at step S3, the routine goes to a step S5 since the present control mode is determined as remaining control halt mode RM. At step S5, following controller 30 executes such a still another transition destination selection procedure as to select to which mode the transition from control halt mode RM occurs. This transition selection destination procedure at step S5 will be described later (as a subroutine).

Thus, after any one of the above-described transition destination selection procedures at respectively corresponding steps of S2, S4, and S5 is ended, the routine goes to a step S6.

At step S6, following controller 30 determines if the present control mode is in control wait mode WM in the same manner as the case of step S1.

If Yes at step S6 (control wait mode WM), the routine goes to a step S7. At step S7, following controller 30 executes a control wait mode procedure and, thereafter, this procedure is ended (the main routine is ended and returns to step S1). If No at step S6 (not in control wait mode WM), the routine goes to a step S8.

At step S8, following controller 30 determines if the present control mode is following mode FM in the same manner as described at step S3. If Yes at step S8 (the following mode), the routine goes to a step S9. At step S9, following controller 30 executes a following mode procedure and, thereafter, this procedure is ended (the main routine is returned to step S1).

If No at step S8 (not the following mode), the routine goes to a step S10. At step S10, following controller 30 executes a control halt mode procedure and, thereafter, this procedure is ended and main routine is returned to step S1.

Figure 4:
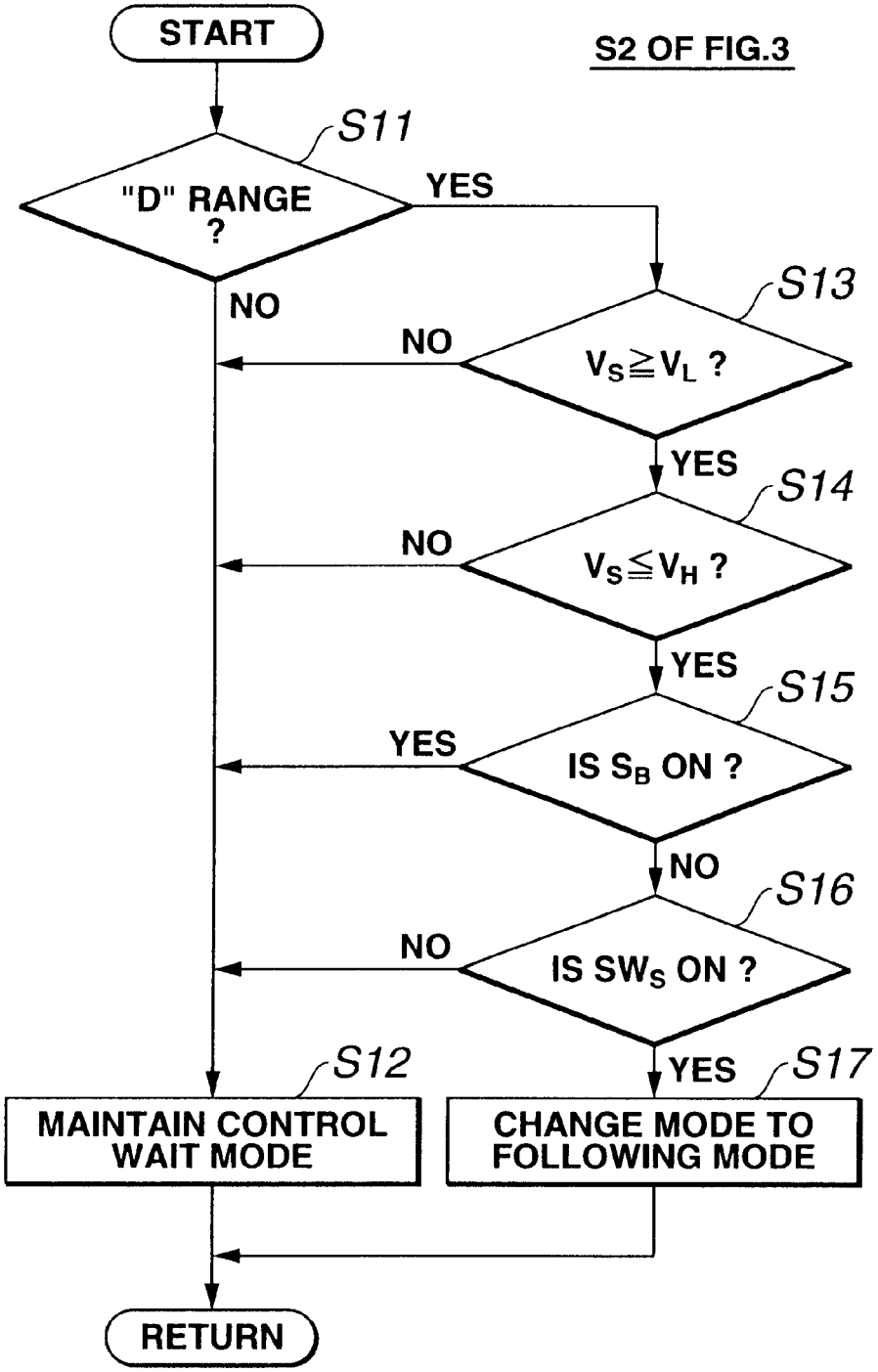
FIG. 4 is an operational flowchart representing a transition destination selection procedure from a control wait mode shown in FIG. 3.

The transition destination selection procedure from control wait mode WM at step S2 (the subroutine at step S2) is shown in FIG. 4.

That is to say, at a step S11, following controller 30 determines whether switch signal $S_{DR}$ of the Drive ("D") range detecting switch $SW_D$ is turned on so as to determine whether the gear range position of automatic transmission 3 is in the Drive range.

If following controller 30 determines that the state of switch signal $S_{DR}$ is in the turned-off state so that the range position of automatic transmission 3 is not in the Drive range (No) at step S11, the routine goes to a step S12. At step S12, following controller 30 maintains the control mode in control wait mode WM, the routine is returned to the main routine, and the main routine is ended.

If Yes at step S11, viz., switch signal $SW_D$ is turned on to indicate that the gear range position is in the Drive range, the routine in FIG. 4 goes to a step S13.

At step S13, following controller 30 determines if vehicular velocity Vs calculated on the basis of wheel velocity signals from front left and right wheel velocity sensors 13FL and 13FR as will be described later is equal to or higher than lowest limit value $V_L$ of a following controllable vehicular velocity range.

If Vs<$V_L$ at step S13 (No), the routine goes to a step S12. If Yes at step S13 (Vs≥$V_L$), the routine goes to a step S14.

At step S14, following controller 30 determines if vehicular velocity Vs is equal to or lower than an upper limit value $V_H$ of the following controllable vehicular velocity range. If Vs>$V_H$ (No) at step S14, the routine goes to step S12. If Vs≤$V_H$ (Yes) at step S14, the routine goes to a step S15.

At step S15, following controller 30 determines if brake pedal 16 is depressed so that switch signal $S_B$ is in the turn on state. If switch signal $S_B$ is in the turned on state (Yes) at step S15, the routine goes to step S12.

If No ($S_B$ is in the turn off state) at step S15, the routine goes to a step S16.

At step S16, following controller 30 determines if set switch $S_{SET}$ is turned on.

If $SW_S$ is turned on (Yes) at step S16, the routine goes to a step S17. If No ($SW_S$ is in the turned off state) at step S16, the routine goes to step S12.

At step S17, following controller 30 changes the present control mode to following mode FM, the routine is returned to the main routine, and the main routine is ended.

It is noted that steps S11 and S13 through S16 serve to determine whether the first condition is established.

Figure 5:
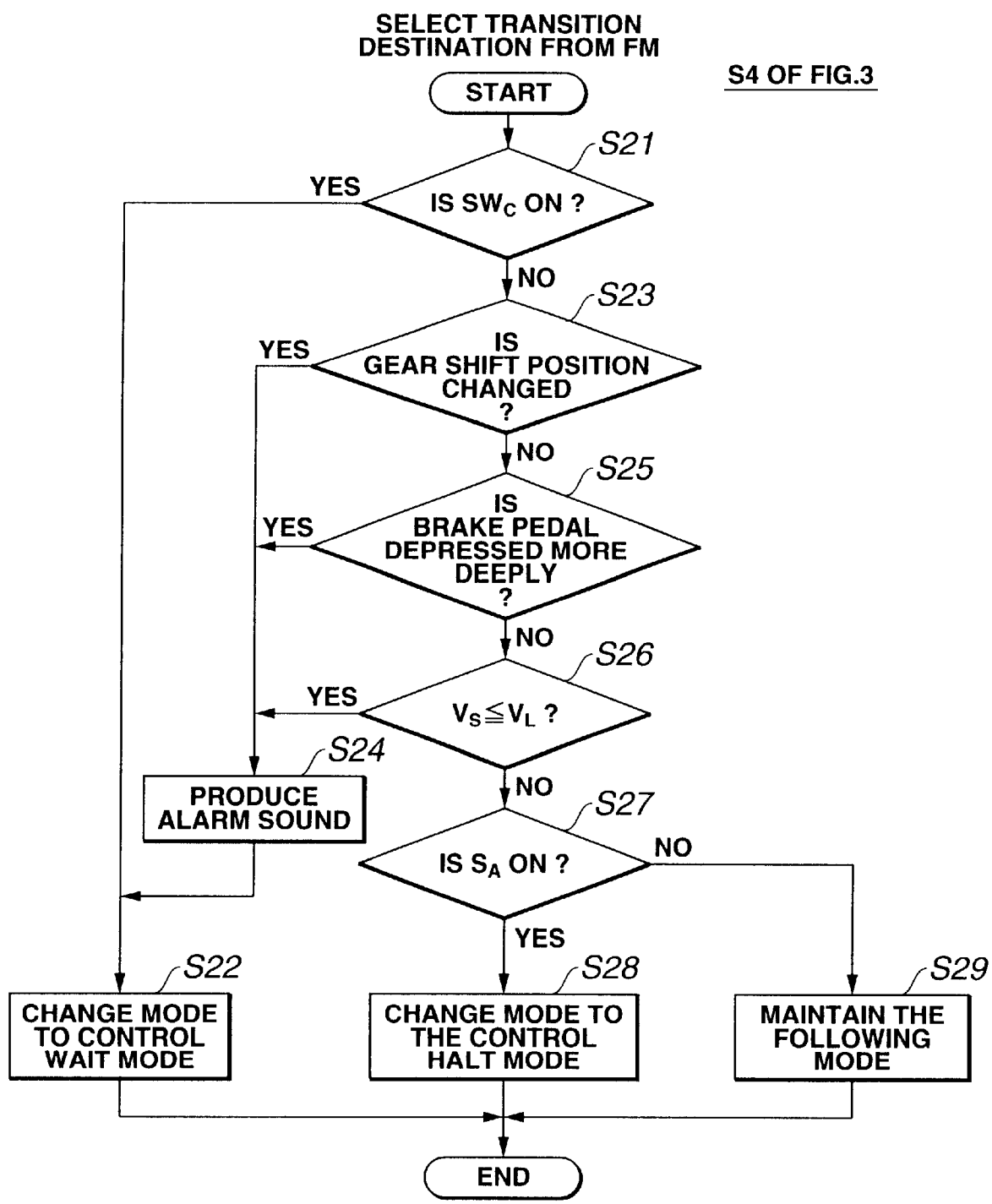
FIG. 5 is an operational flowchart representing a transition destination selection procedure from a following mode shown in FIG. 3.

In addition, FIG. 5 shows the other transition destination selection procedure in following mode FM at step S4 in the following control procedure shown in FIG. 3 (as a subroutine).

At step S21, following controller 30 determines whether switch signal $S_{CAN}$ of cancel switch $S_{WC}$ is turned on. If switch signal $S_{CAN}$ is turned on (Yes) at step S21 ($SW_C$ ON), the routine goes to a step S22.

At step S22, following controller 30 changes the present control mode to control wait mode WM and, then, the routine is ended.

If switch signal $S_{CAN}$ indicates the turned-off state of cancel switch $SW_C$ (No) at step S21, the routine goes to a step S23.

At step S23, following controller 30 determines if the gear range position of automatic transmission 3 has changed from the Drive range to another range according to the state of switch signal $S_{DR}$ of Drive range detecting switch $SW_D$. If switch signal $S_{DR}$ indicates the turned-off state (Yes) at step S23, following controller 30 determines that the range position of automatic transmission 3 has been changed from the Drive range to another range and the routine goes to a step S24.

At step S24, follow-run controller 30 outputs alarm signal AS having a logical value of "1" to alarm unit 31 and the routine goes to step S22.

If switch signal $S_{DR}$ remains in the turned-on state (No) at step S23, following controller 30 determines that the range position of automatic transmission 3 remains at the Drive range and the routine goes to a step S25.

At step S25, following controller 30 reads a present braking pressure $P_B(n)$ detected by brake pressure sensor 18 and compares read braking pressure $P_B(n)$ with target braking pressure $P_B^*$ to determine if a vehicular driver's deeper depression on brake pedal 16 occurs.

If brake pedal 16 is depressed more deeply (Yes) at step S25, the routine goes to above-described step S24. If No at step S25, the routine goes to a step S26.

At step S26, following controller 30 determines if vehicular velocity Vs is equal to or lower than lowest limit value $V_L$ of the following controllable vehicular velocity range.

If $Vs \leq V_L$ (Yes) at step S26, the routine goes to step S24.

If $Vs > V_L$ (No) at step S26, the routine goes to step S27.

At step S27, following controller 30 determines whether switch signal $S_A$ of accelerator switch 15 is in the on state to determine if the vehicular driver has depressed accelerator pedal 14.

If switch signal $S_A$ is in the on state (yes), the routine goes to a step S28 in which the present control mode is changed to control halt mode RM and the present routine is ended. If switch signal $S_A$ is in the off state (No) at step S27, the routine goes to a step S29 in which the present following mode FM is maintained (remains unchanged) and the present routine is ended.

In the other transition destination selection procedure shown in FIG. 5, the contents of steps S21 through S26 serve to determine if the second condition is established and the contents of steps S21 through S27 serve to determine if the fourth condition is established.

Figure 6:
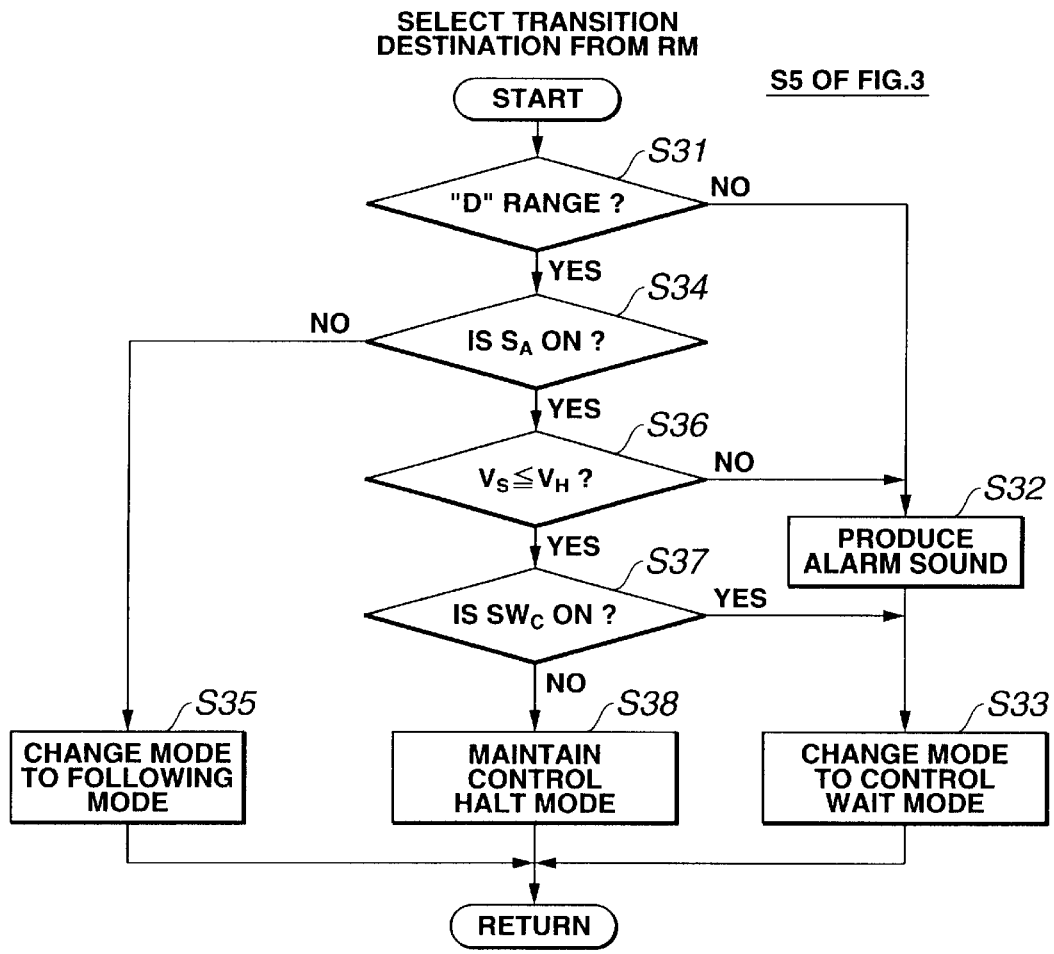
FIG. 6 is an operational flowchart representing a transition destination selection procedure from a control halt mode shown in FIG. 3.

Then, FIG. 6 shows the still other transition destination selection procedure from control halt mode RM at step S5 shown in FIG. 3 (as a subroutine).

As shown in FIG. 6, at a step S31, following controller 30 determines whether the range position of automatic transmission 3 is at the Drive range according to whether switch signal $S_{DR}$ of Drive range detecting switch $SW_D$ is in the on state or changed to the off state. If switch signal $S_{DR}$ changed from the on state to the off state (No) at step S31, following controller 30 determines that the range position at automatic transmission 3 has changed from the Drive range and the routine goes to a step S32.

At step S32, following controller 30 outputs alarm signal AS having the logical value of "1" to alarm unit 31 and the routine goes to a step S33 in which the present control mode is changed to control wait mode WM and the present routine is ended. If switch signal $S_{DR}$ remains in the on state (yes) at step S31, the routine goes to a step S34.

At step S34, following controller 30 determines whether the vehicular driver has depressed accelerator pedal 14 according to whether switch signal $S_A$ of accelerator switch 15 is in the on state. If accelerator switch $S_A$ is in the off state (No) at step S34, following controller 30 determines that the accelerator manipulation is ended and the routine goes to a step S35. At step S35, following controller 30 changes the present control mode to following mode FM and the present routine is ended.

If switch signal $S_A$ is in the on state (yes) at step S34, following controller 30 determines that the acceleration manipulation is continued and the routine goes to a step S36.

At step S36, following controller 30 determines if vehicular velocity Vs is equal to or lower than upper limit value $V_H$ of the following controllable vehicular velocity range. If $Vs > V_H$ (No), viz., vehicular velocity Vs is in excess of upper limit value $V_H$ at a step S36, the routine goes to step S32. If $Vs \leq V_H$ (Yes) at step S36, the routine goes to a step S37.

At step S37, following controller 30 determines if switch signal $S_{CAN}$ of cancel switch $SW_C$ is in the on state. If switch signal $S_{CAN}$ indicates the turned off state (No) at step S37, the routine goes to a step S38 in which present control halt mode RM is maintained and the present routine is ended.

If switch signal $S_{CAN}$ indicates the turn-on state (Yes) at step S37, the routine goes to step S33.

In the transition destination selection procedure shown in FIG. 6, the contents of steps S31, S35, and S36 serve to determine if the fifth condition is established and the contents of steps S31 and S34 serve to determine whether the third condition is established.

Figure 7:
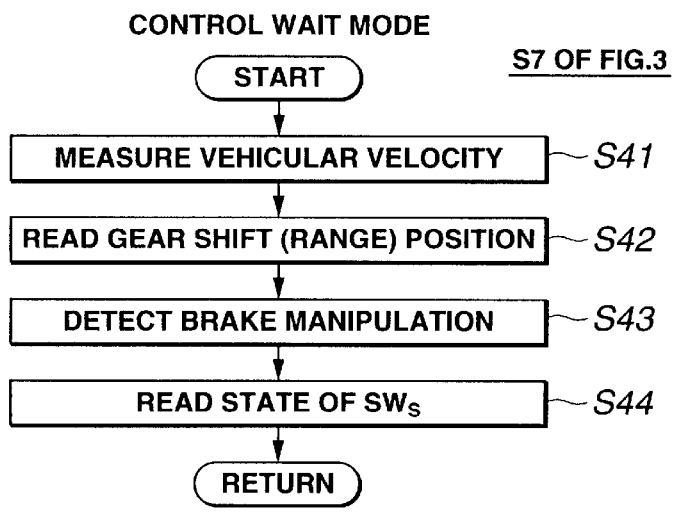
FIG. 7 is an operational flowchart representing a control halt mode procedure shown in FIG. 3.

Furthermore, FIG. 7 shows the control wait mode procedure at step S7 shown in the following control procedure shown in FIG. 3 (as a subroutine).

As shown in FIG. 7, at a step S41, following controller 30 measures the number of pulses per unit time or an elapsed time between each pulse of a detection pulse train signal detected by means of wheel velocity sensors 13FL and 13FR and retrieves a predetermined tire outer diameter from a memory to calculate wheel velocities $V_{FL}$ and $V_{FR}$ and to calculate an average value of $V_{FL}$ and $V_{FR}$ to derive vehicular velocity Vs.

At step S42, following controller 30 reads at least the state of switch signal $S_{DR}$ of Drive range detecting switch $SW_D$ installed on the Drive range position of the select lever of automatic transmission 3 to change over the range of automatic transmission 3.

At step S43, following controller 30 reads the state of switch signal $S_B$ of brake switch 17. At a step S44, following controller 30 reads the state of switch signal $S_{SET}$ of set switch $SW_S$.

Then, the routine shown in FIG. 7 is ended.

FIG. 8 shows the following mode procedure at step S9 in the following control procedure shown in FIG. 3 (as a subroutine).

At a step S51, following controller 30 reads the state of switch signal $S_{CAN}$ of cancel switch $SW_C$ At a step S52, following controller 30 reads inter-vehicle distance L detected by inter-vehicle distance sensor 12. At a step S53, following controller 30 measures vehicular velocity Vs in the same way as described at step S41 shown in FIG. 7. At a step S54, following controller 30 reads the state of switch signal $S_{DR}$ of Drive range detecting switch $SW_D$.

At a step S55, following controller 30 reads the state of switch signal $S_B$ of brake switch 17.

At a step S56, following controller 30 reads the state of switch signal $S_A$ of accelerator switch 15. At a step S57, following controller 30 calculates target inter-vehicle distance L* using the following equation (1) on the basis of vehicular velocity Vs when inter-vehicle distance sensor 12 traps the preceding vehicle, calculates target vehicular velocity V* on the basis of a deviation between target inter-vehicle distance L* and inter-vehicle distance L, when inter-vehicle distance sensor 12 traps the preceding vehicle, sets set vehicular velocity $V_{SET}$ set by the vehicular driver as target vehicular velocity V* when no preceding vehicle has been trapped, performs a vehicular velocity control procedure on the basis of calculated or set target vehicular velocity V*, and performs controls over brake controller 8, engine output controller 9, and automatic transmission controller 10.

$$L^* = V_S \cdot V_{CF} + T_{OF} \qquad (1)$$

In the equation (1), $V_{CF}$ denotes time duration (so-called, an inter-vehicle time duration) it takes for the vehicle to reach to position $L_0$ (meters) behind the present preceding vehicle and $T_{OF}$ denotes an offset time.

It is noted that, in the vehicular velocity control procedure, vehicular velocity Vc as an object to be controlled is selected from a smaller one of calculated target vehicular velocity V* and set vehicular velocity $V_{SET}$ set by the vehicular driver [Vc=min(V*, $V_{SET}$)].

n, either a vehicular velocity servo system through a robust model matching control technique and constituted by a model matching compensator and a robust compensator as described in a U.S. Pat. No. 5,959,572 issued on Sep. 28, 1999 (the disclosure of which is herein incorporated by reference) or a generally available feedback control system is applied so that a driving force command value $F_{OR}$ and a disturbance estimated value dv^ to make vehicular velocity Vs substantially equal to vehicular velocity Vc of the object to be controlled, target driving force F* which is a deviation of command value $F_{OR}$ and estimated value dv^ are calculated, and the vehicular velocity is controlled through the control over brake controller 8, engine output controller 9, and/or automatic transmission (A/T) controller 10.

Furthermore, FIG. 9 shows the control halt mode procedure at step S10 in the following control procedure in FIG. 3.

As shown in FIG. 9, at a step S61, following controller 30 calculates vehicular velocity Vs. At a step S62, switch signal $S_{DR}$ of Drive range detecting switch $S_{WD}$ is read. At a step S63, switch signal $S_A$ of the accelerator switch 15 is read. At a step S64, switch signal $S_{CAN}$ of cancel switch $S_{WC}$ is read and the present routine is ended.

The following control procedure in FIG. 3 corresponds to the following control means. The contents of step S53 in FIG. 8, the contents of step S61 in FIG. 9, and vehicular velocity sensors 13FL and 13FR correspond to wheel velocity detecting means.

Hence, suppose now that ignition switch $SW_{IG}$ is turned off, the select lever is placed in a parking range ("P") range and a parking brake (not shown) is operated so that the vehicle is stopped together with the preceding vehicle. In this state, since the power to the following controller 30 falls in the control stop state.

A vehicular occupant(s) gets on the vehicle under the control halt state, the power is supplied to following controller 30, and the control is started.

At this time, since relay circuit 21 is in a non-bias state when ignition switch $SW_{IG}$ is turned off, main switch $SW_M$ is turned off.

When the control is started by means of following controller 30, an initialization causes the control mode to be set in control wait mode WM and each switch and the sensor signals are read. However, the following control procedure shown in FIG. 3 is stopped.

From the above-described state, exchange switch 20 of main switch $SW_M$ is placed from the neutral position to the ON position. Accordingly, relay circuit 21 is turned on so as to be in the self hold state. Even if exchange switch 20 is returned to the neutral (N) position, switch signal $S_M$ is continued to be on state.

As described above, if main switch $SW_M$ is turned on, the following control procedure in FIG. 3 is started. At this time, control wait mode WM is initialized and the routine of FIG. 3 goes from a step S1 to a step S2. The transition destination selection procedure from control wait mode WM shown in FIG. 4 is executed. Since the range in automatic transmission 3 is selected into parking range through the select lever, the routine goes from step S11 shown in FIG. 4 to step S12 in which the control wait mode is maintained.

Thereafter, when the preceding vehicle is started, the depression of brake pedal 16 is released, and, then, the vehicle is started with accelerator pedal 15 depressed so that vehicular velocity Vs becomes equal to or higher than lowest limit value $V_L$, the routine shown in FIG. 4 goes from step S13 to step S14. Since vehicular velocity Vs is equal to or lower than upper limit value $V_H$, the routine goes further to step S15. Since brake pedal 16 is released, the routine goes to step S17 in which the present control mode is changed from the control wait mode to following mode FM. At this time, since set switch $SW_S$ is operated according to the vehicular driver's will, an alarm sound is not produced from alarm unit 31.

In the following mode, since the preceding vehicle is trapped by means of inter-vehicle distance sensor 12, a target acceleration (/deceleration) is calculated in such a manner that inter-vehicle distance L is made substantially equal to target inter-vehicle distance L*. Therefore, target driving force F* (it is noted that the target driving force includes a target braking force since the target braking force is a negative value of the target driving force) indicates a positive value. When command value TH of the throttle valve of engine 2 as shown in FIG. 1A is outputted to engine output controller 9, the vehicle is started and is accelerated.

In following mode FM, the preceding vehicle is decelerated or the preceding vehicle is interrupted from another traffic lane into the same traffic lane as the vehicle. Hence, since inter-vehicle distance L becomes narrower than target inter-vehicle distance L*, target driving force F* indicates a negative value.

At this time, throttle opening angle command value TH indicates "0" representing a full closure state of the throttle valve opening angle of engine 2 and shift position signal TS which commands transmission controller 10 to issue, for example, a downshift command according to its necessity so that an engine braking force is increased and target braking pressure $P_B^*$ which accords with target driving force F* is outputted so that the vehicular brake system becomes active and inter-vehicle distance L is made substantially equal to target inter-vehicle distance L*.

If inter-vehicle distance L is placed in the vicinity to target inter-vehicle distance L*, shift position signal TS which commands an up-shift from the present gear position to transmission controller 10 and target braking pressure $P_B^*$ is also decreased. If inter-vehicle distance L is made substantially equal to target inter-vehicle distance L* so that target driving force F* indicates a positive value, throttle opening angle command value TH is accordingly outputted to engine output controller 9 and the control is recovered to the driving force control state.

In the inter-vehicle distance control state, if the inter-vehicle distance sensor 12 cannot trap the preceding vehicle, the vehicular velocity is controlled in such a manner that set vehicular velocity $V_{SET}$ set by the vehicular driver is made substantially equal to vehicular velocity Vs.

In following mode FM, the preceding vehicle is decelerated due to a red light indication at a far-off intersection, target braking pressure $P_B^*$ is outputted to maintain the vehicle at target inter-vehicle distance L* so that the vehicular deceleration control is carried out. Then, if vehicular velocity Vs is equal to or lower than lower limit value of $V_L$ in the transition destination selection procedure shown in FIG. 5, the routine goes to step S24 in which alarm signal AS having the logical value of "1" is outputted to alarm unit 31 to produce the alarm sound. Then, the routine goes to step S22 shown in FIG. 5. At step S22, the control is recovered to control wait mode WM. Hence, the producing of the alarm sound can assure the vehicular driver to recognize that control is transferred to control wait mode WM without involvement of the vehicular driver's manipulation.

In the same manner, in a case where the braking force is increased with brake pedal 16 depressed deeply, in following mode FM, the vehicular driver has carried out for the vehicle to be decelerated. Since the vehicular driver has not recognized that the brake pedal depression has its other function to release following mode FM, the routine goes to step S24. At step S24, the alarm sound is produced by means of alarm unit 31 so as to be enabled to assure the recognition by the vehicular driver that the mode transition to control wait mode WM occurs.

Thereafter, if the preceding vehicle has started with the red light turned to a green light, the present control mode is recovered into following mode FM when the vehicular driver has depressed accelerator pedal 14 and set switch $SW_S$ is turned to ON, vehicular velocity Vs being accelerated and being equal to or higher than lower limit value $V_L$, the vehicular driver's will causes the control mode to be recovered to following run mode FM.

In addition, if the vehicular driver uses the select lever to select the range into a second ("2") speed range to effect the engine braking on the vehicle, switch signal SD of Drive range detecting switch $SW_D$ is turned off.

In the transition destination selection procedure of FIG. 5, the routine goes from step S23 to step S24 so that the alarm sound is produced by means of alarm unit 31. Then, the routine goes to step S22 in which the control mode is changed to control wait mode WM. In this case, since the vehicular velocity driver's selection of the range to the "2" range means the vehicular deceleration manipulation, the vehicular driver may not recognize this deceleration manipulation has the other function to release following mode FM. Hence, the producing of the alarm sound through alarm unit 31 assures the vehicular driver to recognize that the mode transition to control wait mode WM has been carried out. In this case, the producing of the alarm sound through alarm unit 31 can assure the vehicular driver to recognize that the transition to control wait mode WM has occurred.

On the other hand, the present following mode is transferred to control halt mode RM if the vehicular driver depresses accelerator pedal 14 so that accelerator switch 15 is turned on.

Then, control halt mode RM is continued when the depression of accelerator pedal 14 is continued and vehicular velocity Vs is lower than upper limit value $V_H$. However, if switch signal $S_A$ is turned off with accelerator pedal 14 released, the present routine shown in FIG. 6 goes from step S34 to step S35 in which the present mode is transferred to the following mode without the alarm sound produced by alarm unit 31.

In addition, when, in control halt mode RM, the vehicular driver selects the range by the select lever other than the Drive range or depresses accelerator pedal 14 so that vehicular velocity Vs is equal to or higher than upper limit value $V_H$, the vehicular driver does not often recognize that the accelerator pedal depression and the vehicular velocity which is equal to or higher than upper limit value $V_H$. Hence, the alarm sound is produced through alarm unit 31 so that it is assured that the vehicular driver can recognize that the mode transition from the present mode to control wait mode WM occurs.

On the other hand, since, in control halt mode RM, cancel switch $SW_C$ is turned on, the vehicular driver recognizes that the mode transition from control halt mode RM to control wait mode WM has occurred. Hence, the routine of FIG. 6 goes from step S26 to step S33 directly so that the mode transition to control wait mode WM occurs without the producing of the alarm sound through alarm unit 31.

As described above, in a case where such a mode transition that the vehicular driver's recognition becomes insufficient (for example, the mode transition such that the driver's manipulation is not involved, the function to transfer the one mode to the other mode is provided in a normal function with the vehicular driver's manipulation involved, in the first embodiment, the alarm sound is produced through alarm unit 31. Hence, it can be assured that the occurrence of the mode transition is recognized by the vehicular driver.

In addition, if the mode transition occurs according to the vehicular driver's will, the alarm sound is not produced by means of alarm unit 31. Hence, it can be suppressed that the vehicular driver is troubled by the alarm sound.

It is noted that, in the first embodiment, target inter-vehicle distance $L^*$ is calculated on the basis of vehicular velocity Vs. However, in inter-vehicle distance L may be differentiated through a band-pass filtering or a high-pass filtering to calculate a relative velocity $\Delta V$, relative velocity $\Delta V$ may be added to vehicular velocity Vs to calculate a vehicular velocity of preceding vehicle Vt, and, then, target inter-vehicle distance $L^*$ may be calculated on the basis of vehicular velocity Vt of the preceding vehicle.

It is also noted that, in the first embodiment, the laser radar is applied to the inter-vehicle distance detecting means (inter-vehicle distance sensor 12). However, the inter-vehicle distance may be calculated using a millimeter wave radar, or alternatively using an image processing of an image photographed by a stereoscopic camera.

It is also noted that although, in the first embodiment, the vehicular velocity is calculated from the wheel velocities of the front road wheels, viz., the non-driven wheels, a vehicular body velocity may be estimated from four wheel velocities including the driven wheels (rear road wheels 1RR and 1RL). Furthermore, a revolution velocity on an output axle of automatic transmission 3 may be used to measure the vehicular velocity.

(Second Embodiment)

A second preferred embodiment of the vehicular run controlling apparatus according to the present invention will be described with reference to FIGS. 10 through 15.

Figure 10:
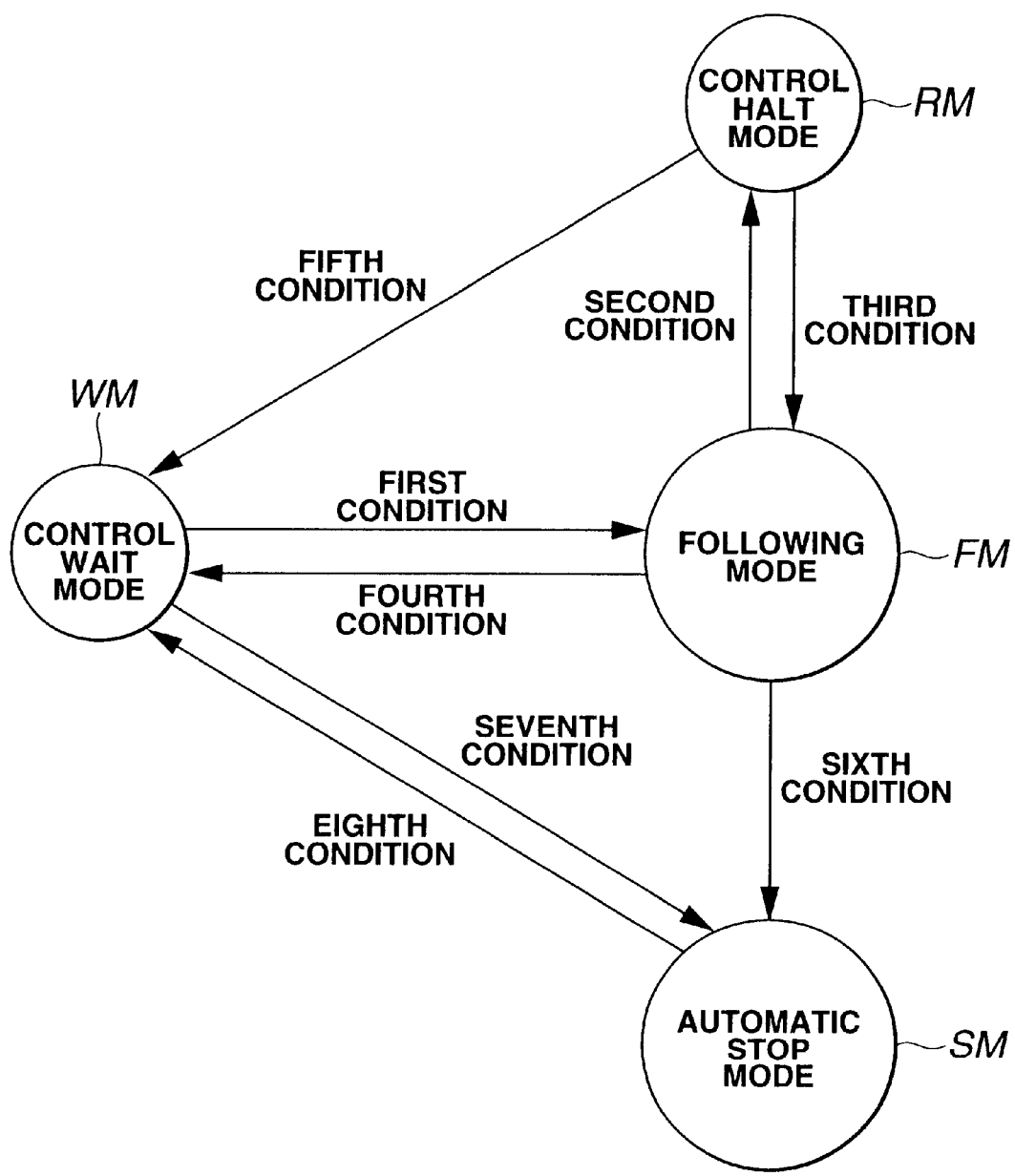
FIG. 10 is a mode transition diagram representing transition modes of the following controller in a case of a second preferred embodiment of the vehicular run controlling apparatus according to the present invention.

In the second embodiment, such an automatic stop mode that the vehicle is held in the stop state with a predetermined braking force held is added to the following control procedure in the above-described first embodiment, as shown in FIG. 10.

That is to say, when, in following mode FM such sixth condition that inter-vehicle distance L is equal to or shorter than predetermined distance value $L_0$ and vehicular velocity Vs is equal to or lower than lower limit value $V_L$ is established, the present mode viz., FM is transferred to automatic stop mode SM. When, in control wait mode WM, such a seventh condition that the gear range position of automatic transmission 3 is in the Drive range, the vehicle is stopped, and set switch $SW_S$ is turned on with brake pedal 16 depressed is established, the control wait mode is changed to automatic stop mode SM. When, in automatic stop mode SM, such an eighth condition that control switch $SW_C$ is turned on, the range of automatic transmission 3 is selected from the Drive range ("D") to any other range, brake pedal 16 is depressed mode deeply, or accelerator switch 15 is in the turn on state is established, automatic stop mode SM is changed to control wait mode WM.

FIGS. 11 through 15 shows processing routines executed in following controller 30 in the case of the second embodiment. The hardware structure in the second embodiment is the same as described in the first embodiment shown in FIGS. 1A and 1B.

Figure 11:
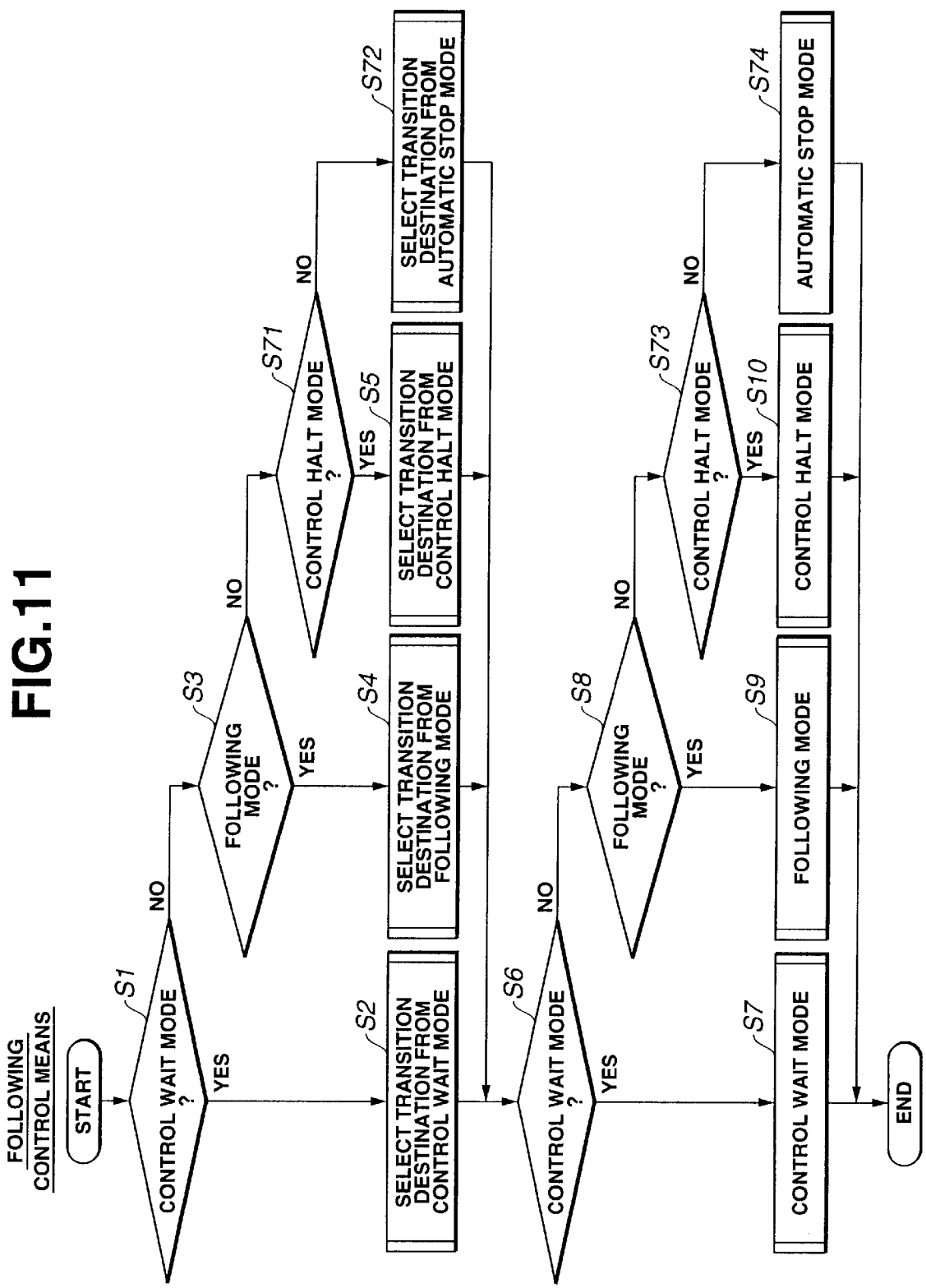
FIG. 11 is an operational flowchart representing an example of the following control procedure executed in the following controller in the second preferred embodiment shown in FIG. 10.

FIG. 11 shows the main routine in the case of the second embodiment. The same-numbered steps (S1 through S10) as described in the first embodiment shown in FIG. 3 are carried out in the same way as shown in FIG. 3.

The determination result in step S3 indicates that the mode is not in following mode FM (No), the routine in FIG. 11 goes to a step S71.

At step S71, following controller 30 determines if the present mode falls in control halt mode RM.

If the present mode is the control halt mode (Yes) a step S71, the routine goes to step S5.

If the present mode is not in the control halt mode (No) at step S71, the routine goes to a step S72.

Figure 14:
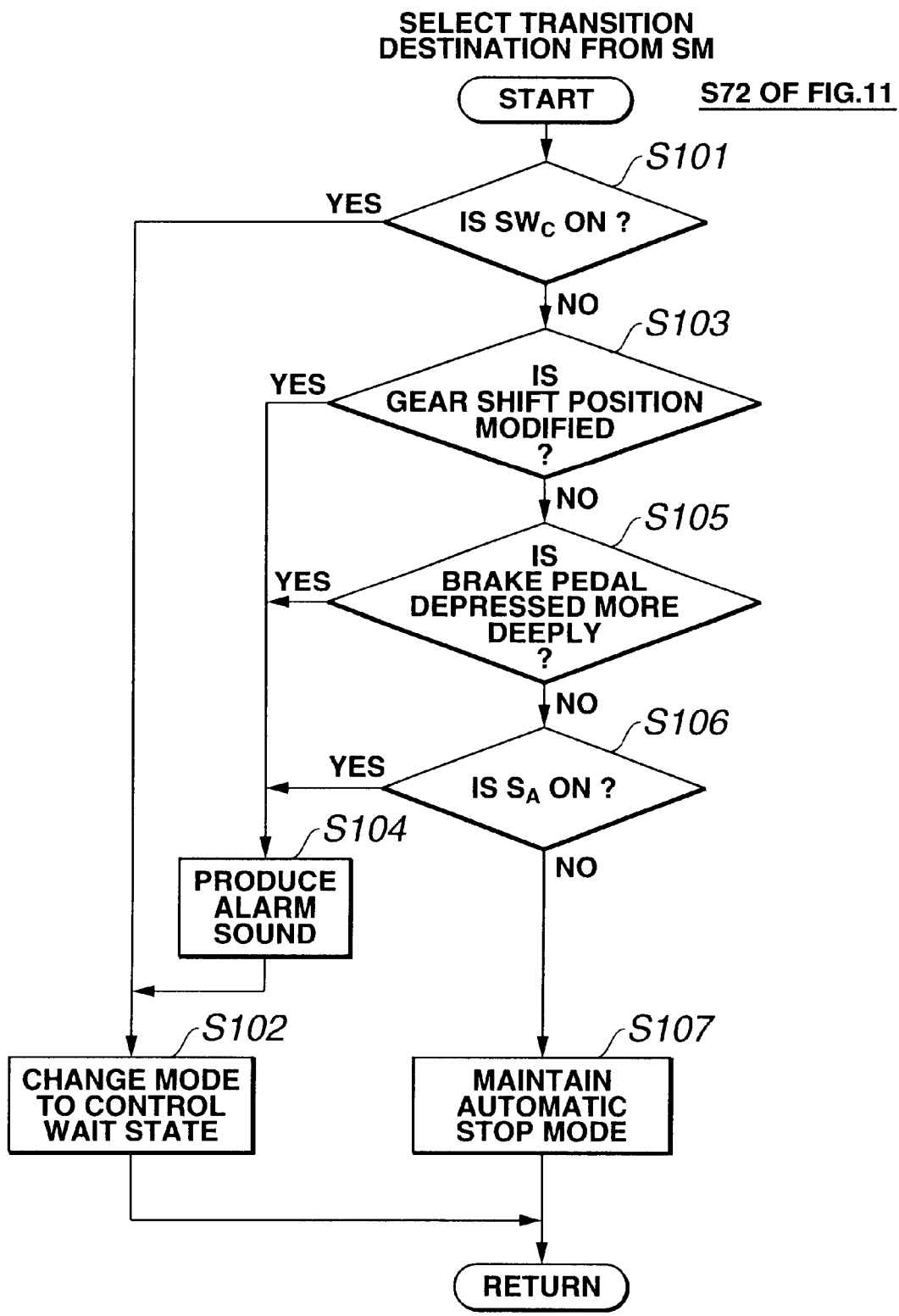
FIG. 14 is an operational flowchart representing a transition destination selection procedure from an automatic stop mode shown in FIG. 11.

At step S72, following controller 30 executes the transition destination selection procedure from automatic stop mode SM as shown in FIG. 14. Thereafter, the routine goes to step S6.

In addition, if the result of the determination at step S8 indicates that the present mode is not following mode (FM) (No), the routine goes to step S73.

At step S73, following controller 30 determines if the present mode is control halt mode RM.

If the present mode is the control halt mode (Yes) at step S73, the routine goes to step S10.

If the present mode is not control halt mode (No) at step S73, the routine goes to a step S74.

Figure 15:
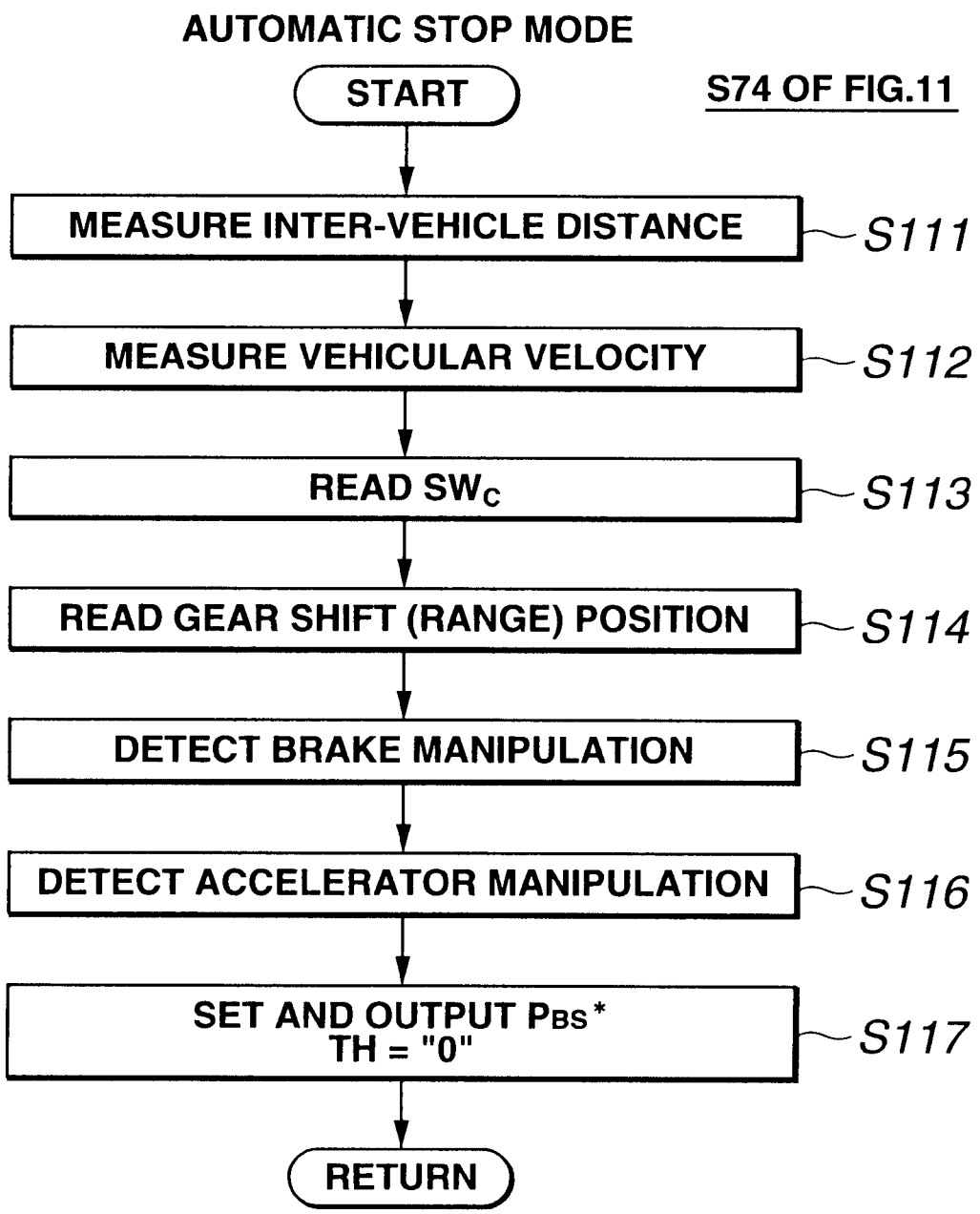
FIG. 15 is an operational flowchart representing an automatic stop mode procedure shown in FIG. 11.

At step S74, following controller 30 executes the automatic stop mode procedure shown in FIG. 15.

Since, at the steps other than those described above, following controller 30 executes the same processes as those described with reference to FIG. 3, the detailed description thereof will herein be omitted.

Figure 12:
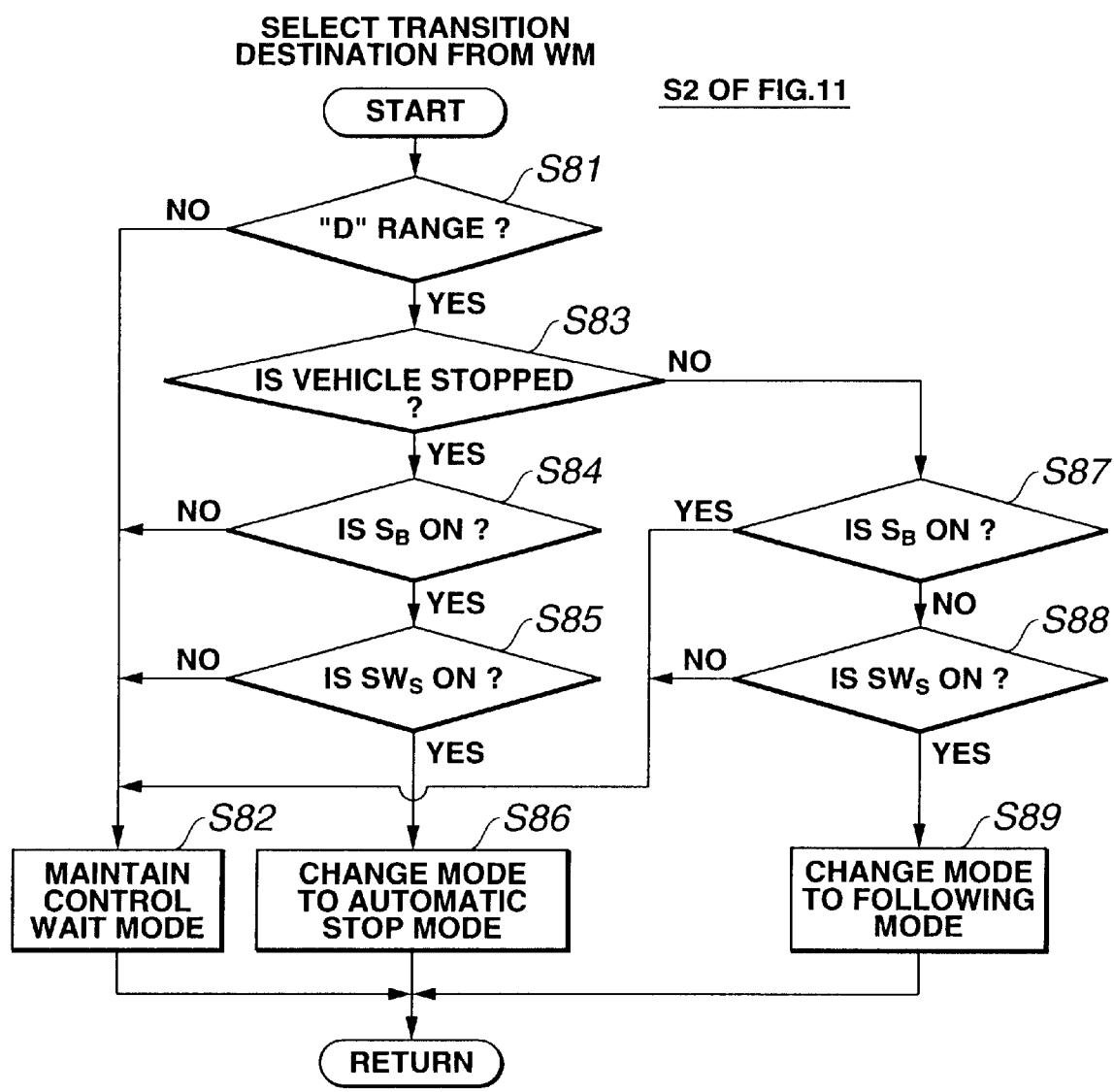
FIG. 12 is an operational flowchart representing a transition destination selection procedure from the control wait mode shown in FIG. 11.

FIG. 12 shows the transition destination selection procedure from control wait mode WM at step S2 in FIG. 11.

As shown in FIG. 12, at step S81, following controller 30 determines if the gear range of automatic transmission 3 is selected to the Drive ("D") range according to whether switch signal $S_{DR}$ of Drive range detecting switch $SW_D$ is turned on.

If switch signal $S_{DR}$ is in the off state (No) at step S81, the routine goes to a step S82.

At step S82, following controller 30 maintains control wait mode WM and the present routine is ended.

If switch signal $S_{DR}$ is turned on (yes) at step S81, the routine goes to a step S83.

At step S83, following controller 30 determines if the vehicle is stopped according to whether the vehicular velocity Vs indicates "0". If Vs=0 (Yes) at step S83, the routine goes to a step S84.

At step S84, following controller 30 determines whether the vehicular driver has depressed brake pedal 16 according to whether switch signal $S_R$ of brake switch 17 is turned on.

If switch signal $S_B$ is turned on (Yes) at step S84, the routine goes to a step S85.

At step S85, following controller 30 determines whether set switch $SW_S$ is turned on.

If set switch $SW_S$ is turned on (Yes) at step S85, the routine goes to a step 586. If set switch $SW_S$ is turned off (No) at step S85, the routine goes to step S82.

At step S86, following controller 30 changes the control mode from control wait mode WM to automatic stop mode SM. Then, the routine is ended.

On the other hand, if the result of determination at step S83 indicates that Vs>0, viz., the vehicle is running, the routine goes to a step S87.

At step S87, following controller 30 has depressed brake pedal 16 in the same manner as described at step S84.

If switch signal $S_B$ of brake switch $SW_B$ is turned on (Yes) at step S87, the routine goes to step S82.

If switch signal $S_B$ is turned off (No) at step S87, the routine goes to a step S88.

At step S88, following controller 30 determines if set switch $SW_S$ is turned on in the same way as described at step S85.

If switch signal $S_{SET}$ of set switch $SW_S$ is turned off (No) at step S88, the routine goes to step S82.

If switch signal $S_{SET}$ is turned on (Yes) at step S88, the routine goes to a step S89.

At step S89, following controller 30 changes the present mode from control wait mode WM to following mode FM and the routine is ended.

Figure 13:
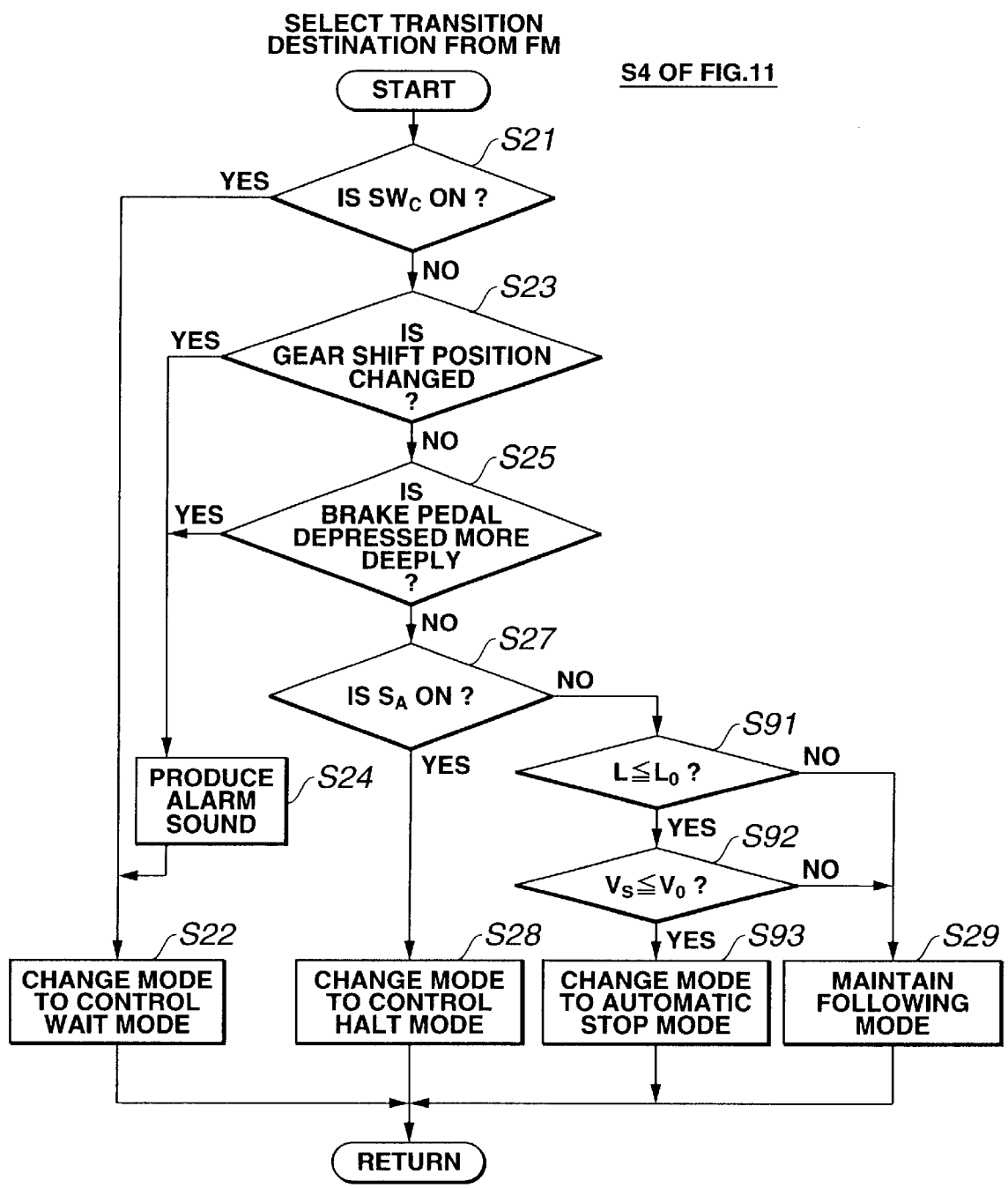
FIG. 13 is an operational flowchart representing a transition destination selection procedure from the following mode shown in FIG. 11.

Furthermore, FIG. 13 shows the transition destination selection procedure from following mode FM at step S2 shown in FIG. 11.

As shown in FIG. 13, step S26 described with reference to FIG. 5 in the first embodiment has been eliminated. In addition, if the result of determination at step S27 indicates that the vehicular driver has not manipulated accelerator pedal 14 and switch signal $S_A$ is turned off (No) at step S27, the routine goes to step S91.

At step S91, following controller 30 determines whether inter-vehicle distance L is equal to or shorter than predetermined inter-vehicle distance value $L_0$.

If $L \leq L_0$ (yes) at step S91, the routine goes to a step S92. If $L > L_0$ (No) at step S91, the routine goes to step S29.

At step S92, following controller 30 determines if vehicular velocity Vs is equal to or lower than predetermined value $V_0$ which is further lower than lower limit value $V_L$ of the following controllable vehicular velocity range.

At step S93, following controller 30 changes the present mode to automatic stop mode SM.

The contents of the other steps than those described above are the same as those described with reference to FIG. 5 and the detailed description of the same numbered steps as those in FIG. 5 will herein be omitted.

Next, FIG. 14 shows the transition destination selection procedure from automatic stop mode SM at step S72 in FIG. 11.

As shown in FIG. 14, following controller 30 determines whether switch signal $S_{CAN}$ of cancel switch $SW_C$ is turned on. If switch signal $S_{CAN}$ is turned on (Yes) at a step S101, the routine goes to a step S102. At step S102, following controller 30 changes the present control mode to control wait mode WM and the present routine is ended.

If switch signal $S_{CAN}$ is turned off (No) at step S101, the routine goes to a step S103.

At step S103, following controller 30 determines whether the gear range position has been changed according to whether switch signal $S_{DR}$ of Drive range detecting Switch $SW_D$ is turned off. If switch signal $S_{DR}$ is turned off (No) at step S103, following controller 30 determines that the range position of automatic transmission 3 has been changed and present routine goes to a step S104. At step S104, following controller 30 outputs alarm signal AS having the logical value of "1" to alarm unit 31 and the routine goes to step S102. If switch signal $S_{DR}$ remains on (No) at step S103, the routine goes to a step S105.

At step S105, following controller 30 reads braking pressure $P_B(n)$ detected by means of braking pressure sensor 18, following controller 30 determines if read braking pressure $P_B(n)$ is higher than target braking pressure $P_{BS}^*$ when the vehicle is stopped so as to determine whether the vehicular driver has depressed brake pedal 16 more deeply.

If the brake pedal is depressed more deeply (Yes) at step S105, the routine goes to a step S104. If brake pedal 16 is not depressed more deeply (No) at step S105, the routine goes to a step S106.

At step S106, following controller 30 determines whether switch signal $S_A$ of accelerator switch 15 is turned on so as to determine whether the vehicular driver has depressed accelerator pedal 14. Then, the routine goes to step S107 if not depressed (switch signal $S_A$ is off (No)) at step S106. If depressed (yes) at step S106, the routine goes to step S104. At step S107, following controller 30 maintains the present mode at the automatic stop mode SM.

In the transition destination selection procedure shown in FIG. 14, the contents of step S101, steps S103 through S106 serve to determine whether the above-described eighth conditions are established.

FIG. 15 shows the detailed automatic stop mode procedure at step S74 in FIG. 11.

As shown in FIG. 15, at step S111, following controller 30 reads inter-vehicle distance L detected by inter-vehicle distance sensor 12.

At step S111, following controller 30 measures vehicular velocity Vs in the same manner as steps S47 shown in FIG. 7.

At step S112, following controller 30 measures vehicular velocity Vs in the same manner as step S41 shown in FIG. 7.

At step S113, switch signal $S_{CAN}$ of cancel switch $SW_C$ is read.

At step S114, following controller 30 reads switch signal $S_{DR}$ of Drive range detecting switch $SW_D$.

At step S115, following controller 30 reads switch signal $S_B$ of brake switch $S_B$.

At step S116, following controller 30 reads switch signal $S_A$ of accelerator switch 15.

At step S117, following controller 30 reads braking pressure $P_B$ detected by braking pressure sensor 18, outputs read braking pressure $P_B$ as target braking pressure $P_{BS}^*$ to brake controller 8, sets opening angle $\theta$ of the throttle valve of engine 2 to "0", and outputs zero throttle valve command value to engine output controller 9.

In the second embodiment, in the same way as the first embodiment, when the present control mode is transferred from automatic stop mode SM to control wait mode WM, its transition triggered causes are several factors. However, in a case where the vehicular driver turns on cancel switch $SW_C$ so that the mode is transferred to control wait mode WM, the information of the occurrence of the mode transition according to this case to the vehicular driver through alarm unit 31 is not carried out.

On the contrary, the mode transition from automatic stop mode SM to control wait mode WM due to the range position change by the vehicular driver, the deeper depression of brake pedal 16, and the depression of accelerator pedal 14 is informed to the vehicular driver through alarm unit 31.

Especially, in a case where accelerator pedal 14 is depressed so that the mode is transferred from automatic stop mode SM to control wait mode WM, the vehicular driver tends to forget that such an accelerator pedal depression as described above is the function peculiar to automatic stop mode SM (in the following mode, the control is not released even if accelerator pedal 14 is depressed and a vehicular start manipulation involves, for example, a double action (the control is, once, released and is reset). With these manipulations in mind, it may be considered that there are several cases of erroneous recognition by the vehicular driver. For example, suppose that, during automatic stop mode SM, the vehicular driver tries to make the vehicle start and depresses accelerator pedal 14 and the vehicle is, then, running with the vehicular driver continued to depress accelerator pedal 14, for a while. At this time, in spite of the fact that the present mode is actually control wait mode WM, the vehicular driver mistakes that the present mode must be control halt mode RM (the vehicular pedal depression from following mode FM) and accelerator pedal 14 is released. The vehicular driver has imagined that the control mode is returned to following mode FM so that the corresponding control is started. However, in this state, the information of the mode transition from automatic stop mode SM to control wait mode WM through alarm unit 31 is carried out. Hence, the vehicular driver can be recognized without failure that the present mode is in control wait mode WM.

Furthermore, when the vehicular driver tries to start the vehicle during automatic stop mode SM, lightly depressing and releasing accelerator pedal 14, the vehicle is started to forward due to a creep phenomenon. At this time, in spite of the fact that the control mode is still in control wait mode WM, the vehicular driver often mistakes that the vehicle is started to forward so that the control is resumed and does not operate set switch $SW_S$ to turn it on. In this case, the information through alarm unit 31 can prevent such a mistake as described above. Or, the vehicular driver often mistakes that the control must be resumed since the vehicle is started to be forwarded and mistakes that the vehicle must be stopped together with the preceding vehicle when the preceding vehicle is again decelerated and is about to be stopped. In this case, the information through alarm unit 31 can prevent the occurrence of the driver's mistakes.

In addition, the following erroneous recognition situation can be supposed in a case where brake pedal 16 is depressed so that the mode is changed from automatic stop mode SM to control wait mode WM.

That is to say, in spite of the fact that the vehicle is stopped in automatic stop mode SM, the vehicular driver himself has depressed brake pedal 16 to effect a manual brake due to the vehicular driver's customary action during the vehicular stop. This action causes the control to be released so that automatic stop mode SM is transferred to control wait mode WM. Hence, the automatic brake becomes ineffective. However, the vehicular driver does not notice this ineffective automatic brake but, expecting that the automatic stop would be continued, releases brake pedal 16. At this time, the vehicle is started to forward due to the creep phenomenon.

However, this case can positively be prevented from occurring according to the information of the occurrence of the mode transition from automatic stop mode SM to control wait mode WM to the vehicular driver through alarm unit 31.

As described above, the occurrence of the mode transition from the one control mode to the other control mode can positively be informed to the vehicular driver in such cases that the vehicular driver mistakes the control states (modes).

It is noted that, in the second embodiment, the mode transition from following mode FM to automatic stop mode SM is possible but the mode transition from automatic stop mode SM to following mode FM is inhibited. However, the mode transition from automatic stop mode SM to following mode FM may be enabled on such a transition condition that, in automatic stop mode SM, the preceding vehicle is started and the turn on of either the accelerator switch 15 or set switch $SW_S$.

It is also noted that, in each of the first and second embodiments, in a case where the mode transition occurs from following mode FM to control wait mode WM due to the occurrence of the range position from the Drive range to any other range or deeper depression on brake pedal 16, the alarm sound is always produced through alarm unit 31. However, it is not limited to this.

Figure 16:
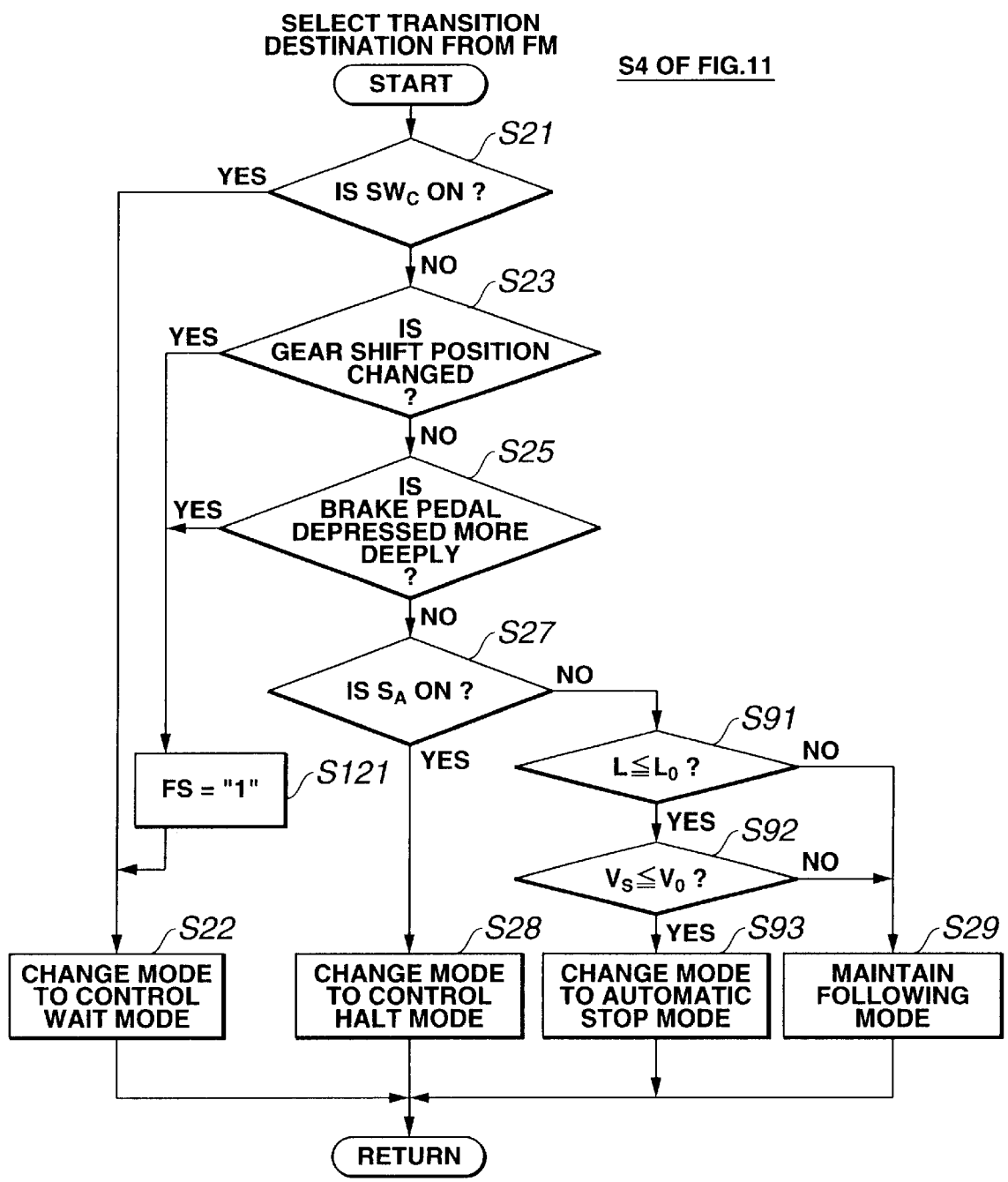
FIG. 16 is an operational flowchart representing another example of the transition destination selection procedure from the following mode shown in FIG. 13.

In details, as shown in FIG. 16, if the result of the determination at step S23 indicates the occurrence of the range position change from the Drive range to another range and if the result of determination at step S25 indicates the occurrence of the deeper depression of brake pedal 16, the routine may go to step S121 in which control flag FS is set to "1" and may go to step S22 without information through alarm unit 31.

Figure 17:
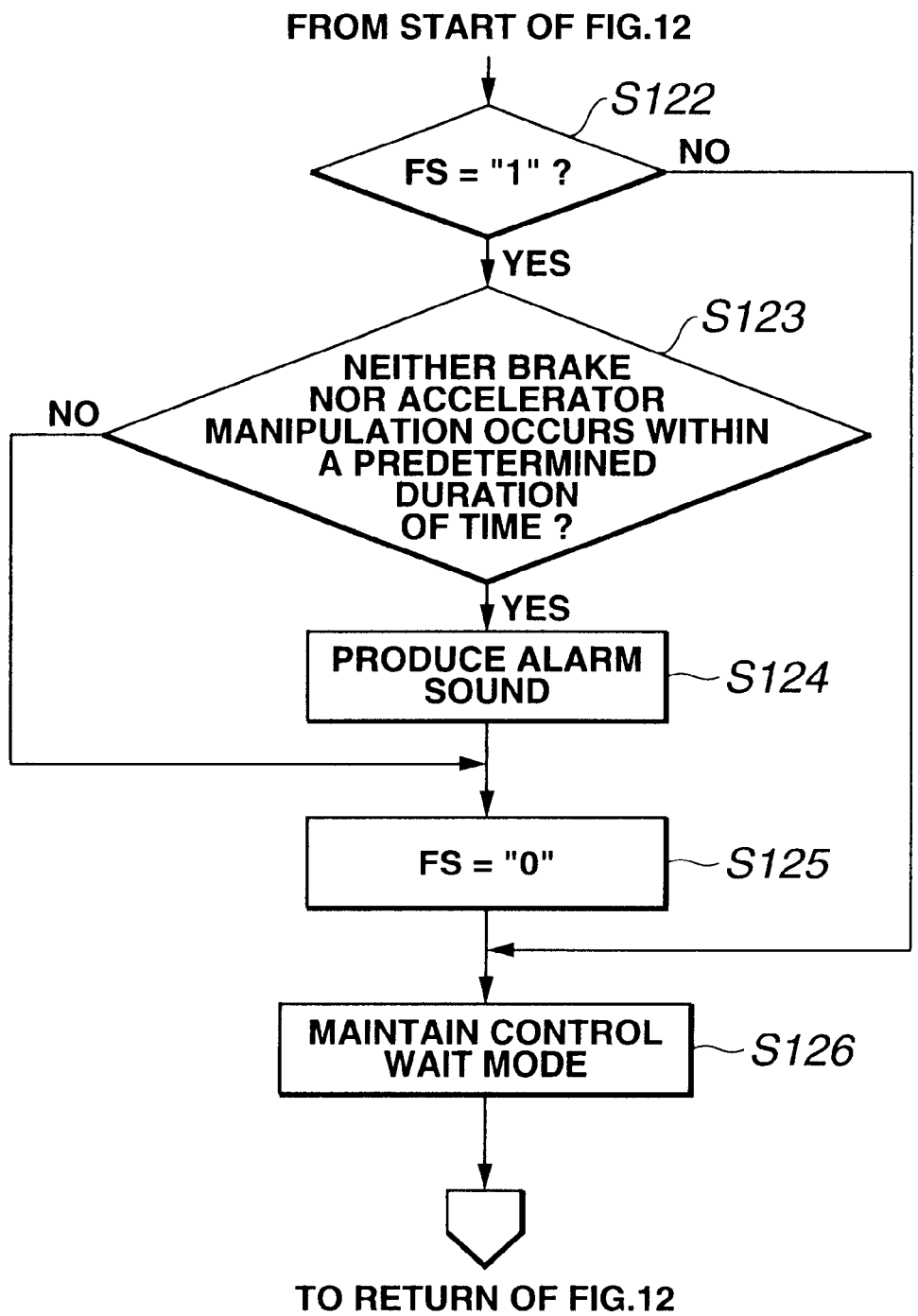
FIG. 17 is an operational flowchart representing a modification of the control wait mode procedure shown in FIG. 12.

In this alternative case, in FIG. 17 which is the control wait mode maintaining procedure at step S82 in FIG. 12, at step S122 in FIG. 17, following controller 30 may determine if control flag FS is set to "1".

If FS="1" (yes) at step S122, the routine shown in FIG. 17 may go to step S123.

At step S123, following controller 30 may determine if neither accelerator switch 15 nor brake switch 17 is operated within a predetermined time duration. If neither accelerator switch 15 nor the brake switch is operated within the predetermined duration of time (Yes) at step S123, following controller 30 may determine that the transition to control wait mode WM is not recognized by the vehicular driver and the routine may go to step S124.

At step S124, following controller 30 may output alarm signal AS to alarm unit 31 to produce the alarm sound. Then, the routine may go to step S125.

At step S125, control flag FS may be reset to "0".

At step S126, following controller 30 may maintain control wait mode WM and the routine shown in FIG. 17 may be ended.

If control flag FS is reset to "0" at step S122 (No), the routine may jump to step S126.

If either accelerator switch 15 or brake switch 17 is turned on within the predetermined duration of time (No) at step S123, the routine may jump to step S125 since following controller 30 may determine that the vehicular driver recognizes the present control mode.

Furthermore, if control flag FS is reset to "0" when the routine shown in FIG. 12 may go to step S86 and to step S89, the alarm sound may be stopped if the vehicular driver recognizes that the mode transition from the following mode to the control wait mode occurs due to the added function although the driver's manipulation is involved. Hence, the vehicular driver can be prevented from feeling troublesome in the alarm sound.

In each of the first and second embodiments, each disc brake 7 is applied to the vehicular brake system and its braking pressure is controlled.

If a regenerative braking is carried out as in an electric motor, its regenerative braking force may be controlled.

If en electric motor is used as a brake actuator, an electric control may be carried out.

In summary, the braking force developed in the brake system may be controlled.

In each of the first and second embodiments, automatic transmission 3 is installed on an output side of engine 2. However, the present invention is applicable to a continuously variable transmission (CVT) mounted vehicle.

In each of the embodiments, the present invention is applicable to the rear-wheel driven vehicle. The present invention is also applicable to a front-wheel driven vehicle or to a four-wheel driven vehicle. Furthermore, the present invention is applicable to the electric vehicle in which an electric motor is mounted as the prime mover in place of engine 2 or to a hybrid vehicle in which both of engine 2 and the electric motor are used as the prime movers of the vehicle.

In the application of the hybrid vehicle or the electric vehicle, an electric motor control may be added to or used in place of engine output controller 9.

(Third Embodiment)

Next, FIGS. 18 through 23 show a third preferred embodiment of the vehicular run controlling apparatus according to the present invention.

In the third embodiment, the present invention is applicable to an automatic steering (maneuver) controlling apparatus which performs an automatic steering control, trapping a traffic lane, in place of the vehicular run controlling apparatus in each of the first and second embodiments.

Figure 18:
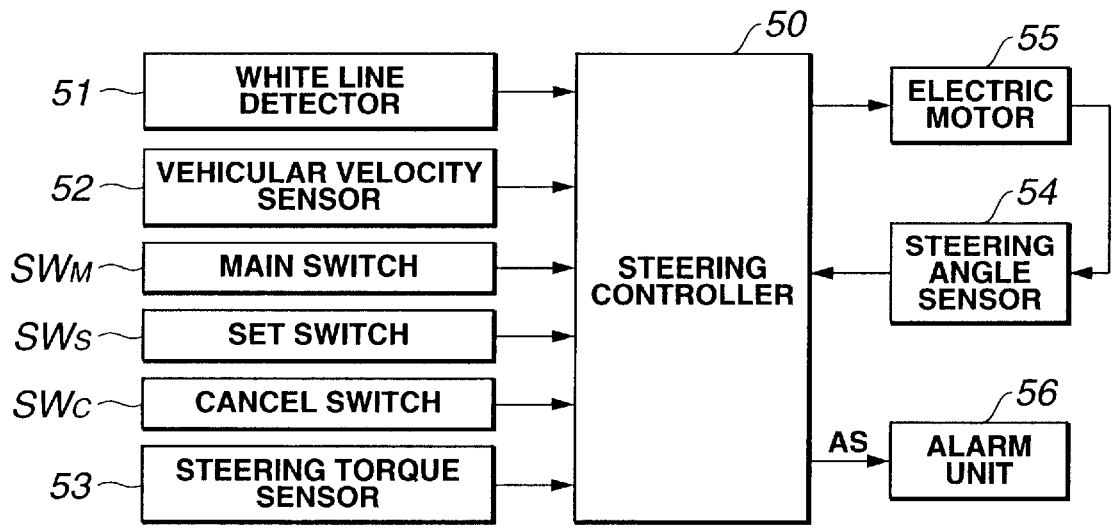
FIG. 18 is a schematic circuit block diagram of an automatic steering controlling apparatus to which the vehicular run controlling apparatus in a third preferred embodiment according to the present invention is applicable.

In the third embodiment, steering controller 50 as the vehicular run controlling means constituted by the microcomputer is installed as shown in FIG. 18.

Steering controller 50 receives each detection signal of: white line detector 51 as the vehicular running environment detecting means; vehicular velocity sensor 52 as vehicular velocity detecting means; main switch $SW_M$ as the vehicular run control setting means; set switch $SW_S$ constituting mode transition instructing means; cancel switch $SW_C$; steering torque sensor 53 to detect a steering torque developed by steering a steering wheel by the vehicular driver; and steering angle sensor 54 that detects a steering angular displacement of a steering actuator to perform an arithmetic/logic operations on the basis of the detection signals. Then, steering controller 50 drivingly controls electric motor 55 as a steering actuator to perform an automatic steering operation for a vehicular steering system. During the occurrence of the mode change, steering controller 50 outputs alarm signal AS having the logical value of "1" to alarm unit 56 to inform the vehicular driver of the occurrence of the mode transition.

White line detector 51 is constituted, for example, by a CCD (Charge Coupled Device) camera mounted in the vehicle.

White line detector 51 recognizes a white line on a road surface which is photographed and calculates and outputs lateral deviation Y1 of an extension line of a center line perpendicular to a vehicular body width direction which is ahead of the vehicle by a predetermined spatial distance.

Figure 19:
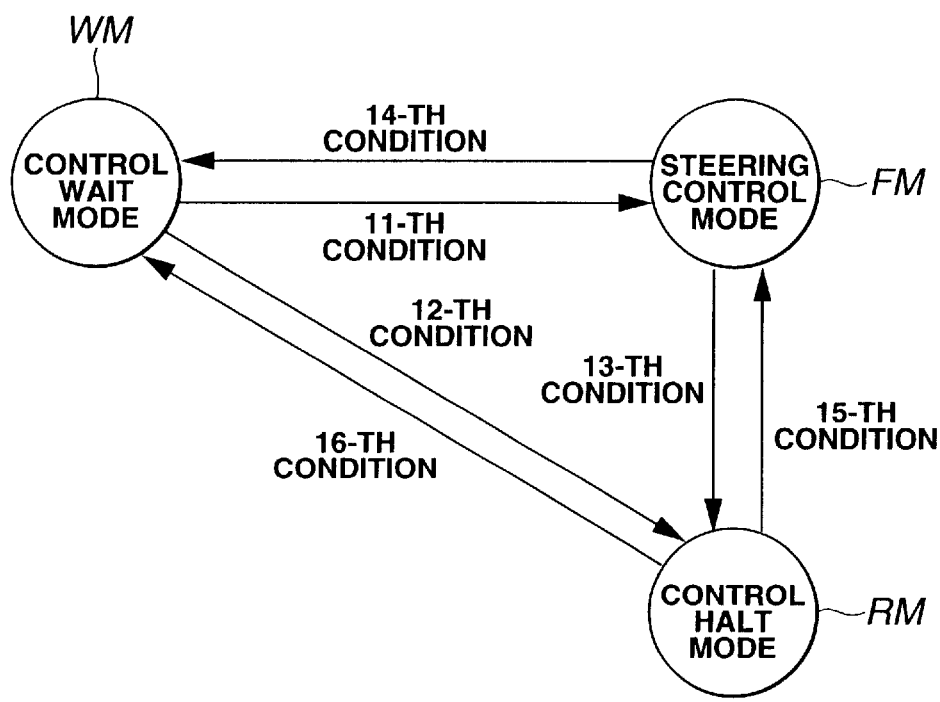
FIG. 19 is a mode transition diagram representing transition modes (states) of a steering controller shown in FIG. 18.

In addition, steering controller 50 has been managed to divide the control mode into three modes of, as shown in FIG. 19, control wait mode WM, steering control mode FM in which controller 50 calculates target steering angle θs* from lateral deviation y1 received from white line detector 51 and vehicular velocity V of vehicular velocity sensor 52 and controls electric motor 55 so that target steering wheel θs* is made substantially equal to actual steering angle θ detected by steering angle sensor 54, and control halt mode RM in which a higher priority is taken over the vehicular manipulation with the control in steering control mode FM halted under the predetermined transition conditions.

That is to say, if main switch $SW_M$ is turned on from its turn-off state, steering controller 50 enters from a steering stop state (not shown in FIG. 19) into control wait mode WM. In control wait mode WM, when such an 11-th (eleventh) condition is established that set switch $SW_S$ is turned on under the state where, in control wait mode WM, the vehicle is running at vehicular velocity V equal to or lower than a predetermined velocity value of Vk and the white line is detected by white line detector 51.

If, in control halt mode RM, such a 12-th (twelfth) condition is established that the vehicle is running at vehicular velocity V equal to or lower than predetermined velocity value Vk, the white line not detected by means of white line detector 51, and set switch $SW_S$ becomes on state, steering controller 50 transfers its mode to control halt mode RM.

When, in steering control mode FM, such a 13-th (thirteenth) condition is established that white line detector 51 cannot detect the white line any more, there is an intervention of the vehicular driver's steering operation, or a winker is operated, the mode transition from steering control mode FM to control halt mode RM occurs as shown in FIG. 19.

When, in the steering control mode, such a 14-th (fourteenth) condition is established that cancel switch $SW_C$ is turned on or vehicular velocity V exceeds predetermined velocity value of Vk is established, the mode transition from steering control mode FM to control wait mode WM occurs.

Furthermore, when, in control halt mode RM, such a 15-th (fifteenth) condition is established that white line detector 51 can detect the white line and the intervention of the vehicular driver's steering operation and the winker operation is ended or becomes eliminated, the mode transition from control halt mode RM to steering control mode FM occurs.

When, in control halt mode RM, such a 16-th (sixteenth) condition that cancel switch $SW_C$ is turned on or that vehicular velocity V exceeds the predetermined velocity value is established, the mode transition from control halt mode RM to control wait mode WM occurs.

Then, steering controller 50 executes a steering control procedures as shown in FIGS. 20 through 23.

Figure 20:
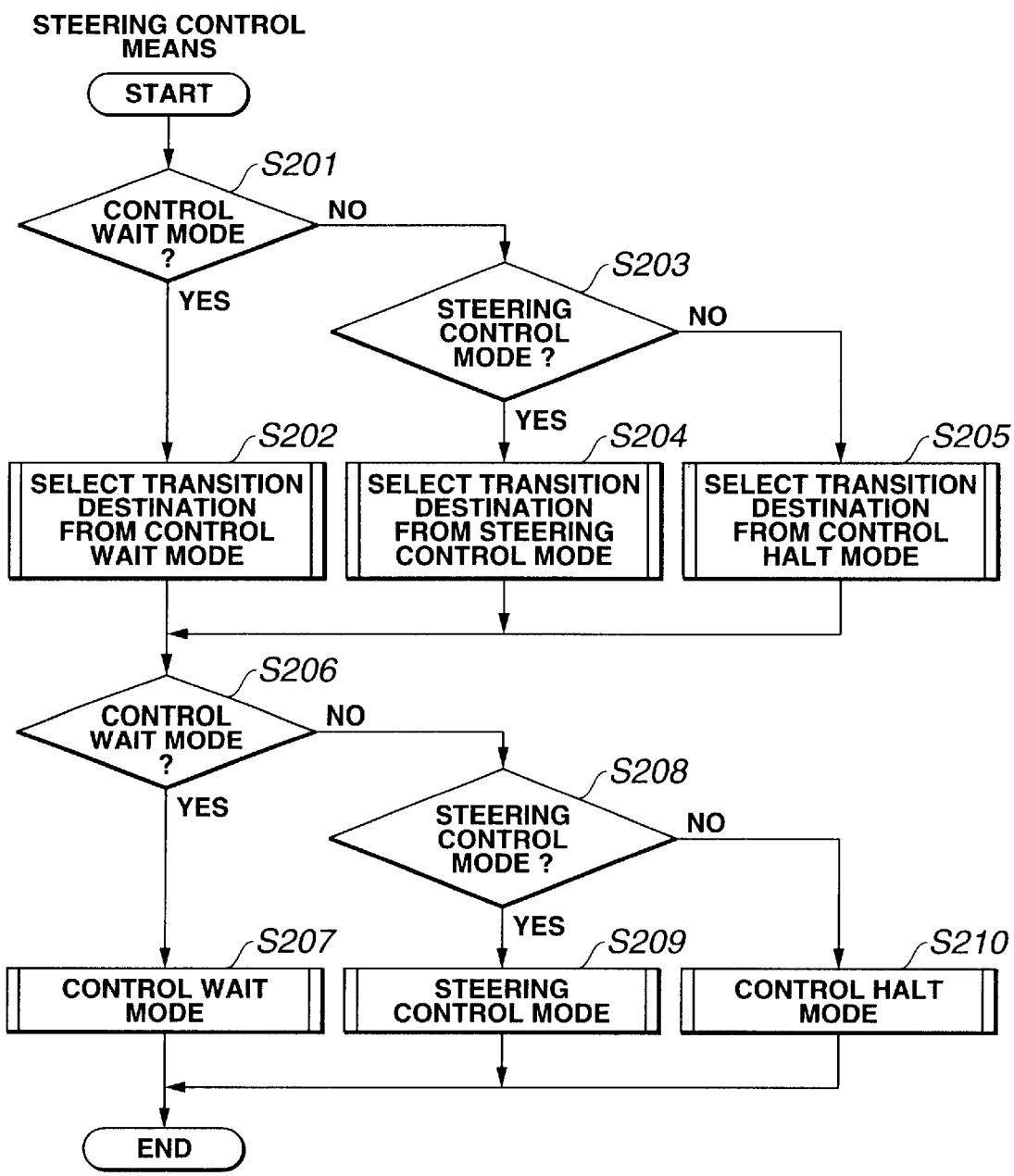
FIG. 20 is an operational flowchart representing an example of a steering control procedure executed by the steering controller.

FIG. 20 shows the steering control selection procedure in the third embodiment (FIG. 20 shows the main routine in the case of the third embodiment).

At a step S201, controller 50 determines if the present mode is in control wait mode WM. If Yes at step S201, the routine goes to a step S202 in which the transition destination selection procedure is executed as shown in FIG. 21.

Figure 21:
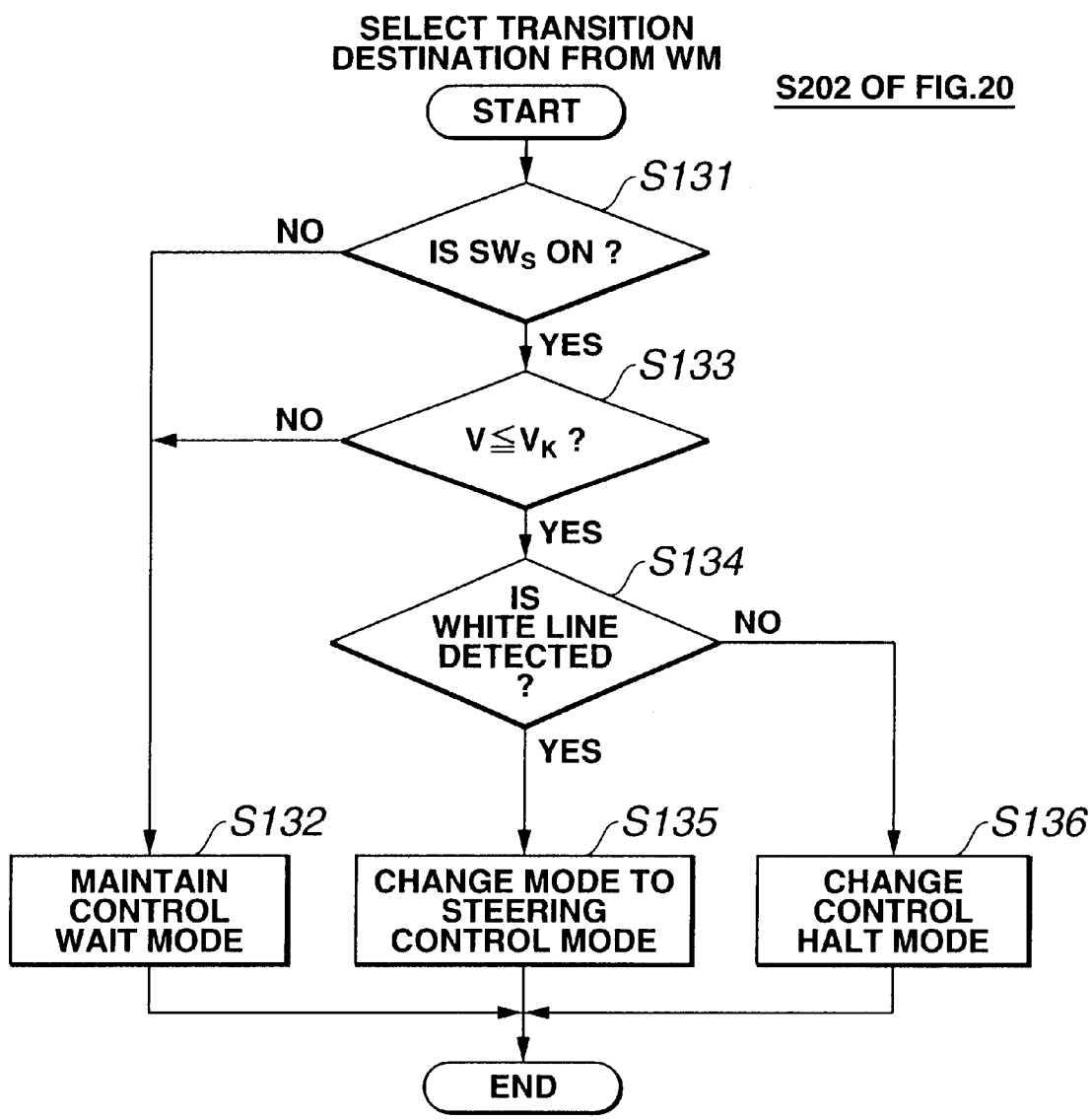
FIG. 21 is an operational flowchart representing the transition destination selection procedure from the control wait mode shown in FIG. 20.

If No at step S201, the routine goes to a step 202 in which the transition destination selection procedure is executed as shown in FIG. 21.

If No at step S201, the routine goes to a step S203.

At step S203, controller 50 determines if the present mode is in a steering control mode FM.

If Yes at step S203, the routine goes to a step S204.

At step S204, the transition destination selection procedure from steering control mode FM shown in FIG. 22 is executed.

If No at step S203, the routine goes to a step S205.

At step S205, the transition destination selection procedure from control halt mode RM shown in FIG. 23 is executed.

Then, controller 50 determines if the present mode is in the control wait mode at a step S206.

If yes at step S206, the routine goes to a step S207 in which the control wait mode processing WM is executed.

If No at step S206, the routine goes to a step S208.

At step S208, controller 50 executes the steering control.

In details, controller 50 calculates target steering angle θs* from lateral deviation Y1 received from white line detector 51 and vehicular velocity V detected by vehicular velocity sensor 52 and executes the steering control such that electric motor 56 is controlled to make actual steering angle θ detected by steering angle sensor 54 substantially equal to target steering angle θs* and the routine is ended.

If not in steering control mode FM (No) at step S208, the routine goes to a step S210.

At step S210, control halt mode RM is executed.

It is noted that except steering control mode FM, the contents of steps S201 through S210 generally correspond to step S1 through S10 shown in FIG. 3.

FIG. 21 shows the transition destination selection procedure from the control wait mode at step S202 in FIG. 20.

At step S131, controller 50 determines if set switch $SW_S$ is turned on. If set switch $SW_S$ is turned on (Yes), the routine goes to step S133. If set switch $SW_S$ is turned off (No) at step S133, the routine goes to a step S132.

At step S132, control wait mode WM is maintained.

At step S133, controller 50 determines if vehicular velocity V is equal to or lower than predetermined velocity value Vk. It is noted that the value of Vk corresponds to upper limit value $V_H$ described in the first embodiment.

If V≦Vk at step S133 (Yes), the routine goes to a step S134.

If V>Vk (No) at step S133, the routine goes to a step S132.

At step S134, controller 50 determines if white line detector 51 detects the white line.

If the white line is detected (Yes) at step S134, the routine goes to a step S135.

If No at step S134, the routine goes to a step S136.

At step S136, the present mode is changed to control halt mode RM.

At step S135, the present mode is changed to steering control mode FM. After each of steps S132, S135, and S136, the routine is ended.

It is noted that the phrase that white line detector 51 cannot be detect the white line any more does not have the meaning that white line detector 51 cannot detect the white line due to its failure (physical trouble).

FIG. 22 shows the transition destination selection procedure from the steering control mode at step S204 shown in FIG. 20.

At step S141, controller 50 determines if cancel switch $SW_C$ is turned on. If cancel switch $SW_C$ is turned on (Yes) at step S141, the routine goes to a step S142.

If cancel switch $SW_C$ is turned off (No) at step S141, the routine goes to a step S143.

At step S142, controller 50 changes the present control mode to control wait mode WM and the present routine is ended.

At step S143, controller 50 determines if vehicular velocity V is equal to or lower than predetermined velocity value Vk. If V>Vk (No) at step S143, the routine goes to a step S144. If V≧Vk (Yes) at step S143, the routine goes to step S145.

At step S144, controller 50 outputs alarm signal AS having the logical value of "1" to produce the alarm sound and the routine goes to step S142.

At step S145, controller 50 determines whether a winker manipulation is carried out. If the winker manipulation is carried out, the routine goes to step S146. With the present control mode maintained at control halt mode RM, the routine is ended. If no winker is manipulated (No) at step S145, the routine goes to a step S147.

At step S147, controller 50 determines whether the intervention of the vehicular driver's manipulation to steer the vehicle through the steering wheel is carried out. If carried out (Yes) at step S147, the routine goes to a step S146.

If not carried out (No) at step S145, the routine goes to a step S147.

At step S148, controller 50 determines whether a white line image has been lost. If the white line image is lost (Yes) at step S148, the routine goes to a step S150. At step S150, controller 50 outputs alarm signal AS having the logical value of "1" to alarm unit 56 to produce the alarm sound and the routine goes to a step S146.

Furthermore, FIG. 23 shows the detailed procedure in the transition destination selection procedure from control halt mode RM at step S205 shown in FIG. 20.

The series of processes from step S151 to step S157 carry out the same processing as steps S141 through S147 in the transition destination selection procedure from steering control mode FM in FIG. 22.

However, at a step S158, controller 50 determines whether white line detector 51 is received from a state in which the white line image is lost to its normal state.

If not received to its normal state (No) at step S158, the routine goes to a step S156 in which control halt mode RM is maintained.

If recovered to its normal state (Yes) at step S158, the routine goes to a step S159.

At step S159, controller 50 outputs alarm signal AS having the logical value of "1" to alarm unit 56 to produce the alarm sound. Then, the routine goes to a step S160 in which the present control mode is changed to steering control mode FM and the routine is ended.

According to the third embodiment, even in the automatic steering control apparatus, the occurrence of the mode transition such that the recognition of the mode transition by the vehicular driver tends to be insufficient is informed to the vehicular driver in the same way as the vehicular following controlling apparatus in the first embodiment. For example, the occurrence of such the mode transition to control halt mode RM due to the loss of the white line image or the resume of the steering control mode due to the recovery of the white line image is the transition such that the vehicular driver is difficult to be noticed due to the fact that the torque developed by the electric motor is not acted upon the steering even during the control in a case where the vehicle is running on a straight road.

In this situation, the steering controlling apparatus can positively inform the vehicular driver of the occurrence of the mode transition described above.

In addition, when the mode transition occurs from steering control mode FM to control wait mode WM due to the fact that the vehicular velocity is increased and exceeded the upper limit vehicular velocity within which the controllable range is set, the information that control wait mode WM is not changed to steering control mode FM unless the vehicular driver turns on set switch SWS can positively be recognized by the vehicular driver.

In addition, convenience in usage can be improved. Furthermore, irrespective of already uncontrollable state, such a mistake by the vehicular driver that the control mode must be steering control mode FM and an excessive expectation that the steering control would be carried out can be prevented from occurring.

It is noted that, in each of the first, second, and third embodiments, the alarm sound is produced when the mode transition recognition by the vehicular driver tends to be insufficient.

However, the occurrence of such a mode transition as is difficult to be recognized by the vehicular driver may be informed to the vehicular driver through a display device constituted by a liquid crystal panel or a light emitting diode.

Hence, an informing device defined in the claims corresponds to the alarm unit described in each of the embodiments or the display device described above.

It is also noted that, in each of the first, second, and third embodiment, the same alarm sound is produced when such a mode transition that the recognition by the vehicular driver tends to be insufficient occurs. However, according to kinds of the mode transitions, timbre (tone color), a pitch of sound, or a sound duration of time may be set so that the alarm sound can cause an identification of the kinds of mode transition to be recognized by the vehicular driver.

The entire contents of a Japanese Patent Application No. Heisei 11-186498 (filed in Japan on Jun. 30, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular run controlling apparatus for an automotive vehicle, comprising:
   a vehicular velocity detector to detect a vehicular velocity of the vehicle;
   a vehicular running environment detector to detect a running environment surrounding the vehicle;
   an informing device; and
   a vehicular run controller to perform a vehicular run control on the basis of the vehicular velocity detected by the vehicular velocity detector and the running environment detected by the vehicular running environment detector, the vehicular run controller having at least two control modes of a control wait mode and a vehicular run mode and including: a vehicular run control setter to set whether the vehicular run control should be started; and a mode transition instructor to instruct a mode transition from one control mode to another control mode in the vehicular run controller according to a vehicular driver's will, the vehicular run controller falling in a state of the vehicular run control when a start of the vehicular run control by means of the vehicular run controller is set through the vehicular run control setter, falling in a halt state of the vehicular run control when a release of the vehicular run control is set through the vehicular run control setter, carrying out the mode transition from one control mode to the other control mode when the mode transition from the one control mode to the other control mode is instructed through the mode transition instructor and when a predetermined condition is established during the vehicular run control irrespective of the vehicular driver's will, and informing the vehicular driver through the informing device of an occurrence of the mode transition from the one control mode to the other control mode when the mode transition from the one control mode to the other control mode occurs.

2. A vehicular run controlling apparatus for an automotive vehicle as claimed in claim 1, wherein the vehicular running environment detector comprises an inter-vehicle distance detector to detect an inter-vehicle distance between the vehicle and a preceding vehicle which is running ahead of the vehicle, wherein the vehicular run controller comprises a vehicular following controller to perform at least one of an inter-vehicle distance control such that the inter-vehicle distance detected by the inter-vehicle distance detector is made substantially equal to a target inter-vehicle distance and a vehicular velocity control such that the vehicular velocity detected by the vehicular velocity detector is made substantially equal to a target vehicular velocity, wherein the vehicular run control mode is a following mode and the vehicular run control setter is a following control setter, and wherein the following controller falls in the state of the following control when the start of the following control by means of the following controller is set through the following control setter, falls in the halt state of the following control when the release of the following control is set through the following control setter, carries out the mode transition from one control mode to the other control mode when the mode transition from the one control mode to the other control mode is instructed through the mode transition instructor, carries out the mode transition from the one control mode to the other control ode irrespective of the vehicular driver's will when the predetermined condition is established during the following control, and informs the vehicular driver of the occurrence of the mode transition from the one control mode to the other control mode through the informing device when the mode transition from the one control to the other control mode occurs.

3. A vehicular run controlling apparatus for an automotive vehicle as claimed in claim 1, wherein the informing device informs the vehicular driver of only the occurrence of the mode transition from the one control mode to the other control mode such that a recognition of the mode transition by the vehicular driver tends to be insufficient.

4. A vehicular run controlling apparatus for an automotive vehicle as claimed in claim 3, wherein the mode transition from the one control mode to the other control mode such that the recognition of the mode transition by the vehicular driver tends to be insufficient is at least one of the mode transition from the one control mode to the other control mode such that the vehicular driver's manipulation for the vehicle is not involved, the mode transition from the one control mode to the other control mode such that occurs according to an additionally provided function other than general an operational function on a vehicular driving system, and the mode transition from the one control to the other control mode such that occurs according to a function additionally provided only for a specific control mode.

5. A vehicular run controlling apparatus for an automotive vehicle as claimed in claim 2, wherein the following controller has a control halt mode in addition to the control wait mode and the following mode and, in the following mode, the following controller informs the vehicular driver of the occurrence of the mode transition from the following mode to the control wait mode through the informing device when the vehicular driver has manipulated a brake manipulator, of the occurrence of the mode transition from the following mode to the control wait mode through the informing device when a gear range position of a vehicular automatic transmission is changed from a Drive range to another range, of the occurrence of the mode transition from the following mode to the control wait mode through the informing device when the vehicular velocity detected by the vehicular velocity detector indicates the vehicular velocity equal to or lower than a predetermined velocity value and inhibits the information to the vehicular driver of the occurrence of the mode transition from the following mode to the control wait mode through the informing device when the vehicular driver operates a cancel switch and of the occurrence of the mode transition from the following mode to the control halt mode when the vehicular driver manipulates an accelerator and wherein the following controller, in the control halt mode, informs the vehicular driver of the occurrence of the mode transition from the control halt mode to the control wait mode through the informing device when the gear range position of the vehicular automatic transmission is changed from the Drive range to another range and of the occurrence of the mode transition from the control halt mode to the control wait mode when the vehicular velocity detected by the vehicular velocity detector indicates the vehicular velocity equal to or lower than the predetermined velocity value and inhibits the information to the vehicular driver of the occurrence of the transition from the control halt mode to the control wait mode when the vehicular driver operates the cancel switch and of the occurrence of the mode transition from the control halt mode to the following mode when the vehicular driver has ended the manipulation of the accelerator.

6. A vehicular run controlling apparatus for an automotive vehicle as claimed in claim 2, wherein the following controller has a control halt mode and an automatic stop mode in addition to the control wait mode and the following mode and, in the following mode, informs the vehicular driver of the occurrence of the mode transition from the following mode to the control wait mode through the informing device when the vehicular driver has manipulated a brake manipulator and of the occurrence of the mode transition from the following mode to the control wait mode when a gear range position in a vehicular automatic transmission is changed from a Drive range to another range, inhibits the information to the vehicular driver of the occurrence of the mode transition from the following mode to the control wait mode through the informing device when the vehicular driver has operated a cancel switch, of the mode transition from the following mode to the control halt mode when the vehicular driver has manipulated an accelerator, and of the mode transition from the following mode to the automatic stop mode when the inter-vehicle distance to the preceding vehicle detected by the inter-vehicle distance sensor is equal to or shorter than a predetermined inter-vehicle distance value and the vehicular velocity is equal to or lower than a predetermined velocity value, in the control halt mode, informs the vehicular driver of the occurrence of the mode transition from the control halt mode to the control wait mode through the informing device when the gear range position of the vehicular automatic transmission is changed from the Drive range to another range and of the mode transition from the control halt mode to the control wait mode when the vehicular velocity detected by the vehicular velocity detector indicates the vehicular velocity equal to or higher than the predetermined velocity value, inhibits the information to the vehicular driver of the occurrence of the mode transition from the control halt mode to the control wait mode through the informing device when the vehicular driver has operated a cancel switch and of the mode transition from the control halt mode to the following mode when the vehicular driver has ended the manipulation on the accelerator, in the automatic stop mode, informs the vehicular driver of the occurrence of the mode transition from the automatic stop mode to the control wait mode through the informing device when the vehicular driver has manipulated the brake manipulator, of the mode transition from the automatic stop mode to the control wait mode when the vehicular driver has manipulated the accelerator, and of the mode transition from the automatic stop mode to the control wait mode when the gear range position of the vehicular automatic transmission is changed from the Drive range to another range, and inhibits the information to the vehicular driver of the occurrence of the mode transition from the automatic stop mode to the control wait mode through the informing device when the vehicular driver has operated the cancel switch.

7. A vehicular run controlling apparatus for an automotive vehicle as claimed in claim 4, wherein, in the following mode, the following controller informs the vehicular driver of the occurrence of the mode transition from the following mode to the control wait mode through the informing device when the manipulation by the vehicular driver for neither a brake manipulator nor an accelerator occurs within a predetermined period of time when the mode transition from the following mode to the control wait mode occurs in response to either the manipulation of the vehicular driver on the brake manipulator or the change of the gear range position from the Drive range to another range.

8. A vehicular run controlling apparatus for an automotive vehicle as claimed in claim 1, wherein the vehicular running environment detector detects a lateral displacement of the vehicle with respect to a white line present on a road surface on which the vehicle is running and wherein the vehicular run mode of the vehicular run controller is a steering control.

9. A vehicular run controlling apparatus for an automotive vehicle as claimed in claim 1, wherein the vehicular running environment detector detects a lateral displacement of the vehicle with respect to a white line present on a road surface on which the vehicle is running and wherein the vehicular run mode of the vehicular run controller is a following control.

10. A vehicular run controlling apparatus for an automotive vehicle, comprising:

vehicular velocity detecting means for detecting a vehicular velocity of the vehicle;

vehicular running environment detecting means for detecting a running environment surrounding the vehicle;

informing means; and vehicular run controlling means for performing a vehicular run control on the basis of the vehicular velocity detected by the vehicular velocity detecting means and the running environment detected by the vehicular running environment detecting means, the vehicular run controlling means having at least two control modes of a control wait mode and a vehicular run mode and including: vehicular run control setting means for setting whether the vehicular run control should be started; and a mode transition instructing means for instructing a mode transition from one control mode to another control mode in the vehicular run controlling means according to a vehicular driver's will, the vehicular run controller falling in a state of the vehicular run control when a start of the vehicular run control by means of the vehicular run controlling means is set through the vehicular run control setting means, falling in a halt state of the vehicular run control when a release of the vehicular run control is set through the vehicular run setting means, carrying out the mode transition from one control mode to the other control mode when the mode transition from the one control mode to the other control mode is instructed through the mode transition instructing means and when a predetermined condition is established during the vehicular run control irrespective of the vehicular driver's will, and conditionally informing the vehicular driver through the informing means of an occurrence of the mode transition from the one control mode to the other control mode when the mode transition from the one control mode to the other control mode occurs.

11. A vehicular run controlling method for an automotive vehicle comprising:

detecting a vehicular velocity of the vehicle;

detecting a running environment surrounding the vehicle;

providing an informing device; and providing a vehicular run controller to perform a vehicular run control on the basis of the detected vehicular velocity and the detected running environment, the vehicular run controller having at least two control modes of a control wait mode and a vehicular run mode and including: a vehicular run control setter to set whether the vehicular run control should be started; and a mode transition instructor to instruct a mode transition from one control mode to another control mode in the vehicular run controller according to a vehicular driver's will, the vehicular run controller falling in a state of the vehicular run control when a start of the vehicular run control by means of the vehicular run controller is set through the vehicular run control setter, falling in a halt state of the vehicular run control when a release of the vehicular run control is set through the vehicular run control setter, carrying out the mode transition from one control mode to the other control mode when the mode transition from the one control mode to the other control mode is instructed through the mode transition instructor and when a predetermined condition is established during the vehicular run control irrespective of the vehicular driver's will, and informing the vehicular driver through the informing device of an occurrence of the mode transition from the one control mode to the other control mode when the mode transition from the one control mode to the other control mode occurs.

\* \* \* \* \*